US012412535B2

(12) United States Patent
Liu et al.

(10) Patent No.: US 12,412,535 B2
(45) Date of Patent: Sep. 9, 2025

(54) DISPLAY APPARATUS

(71) Applicants: Chengdu BOE Optoelectronics Technology Co., Ltd., Sichuan (CN); BOE Technology Group Co., Ltd., Beijing (CN); Beijing BOE Technology Development Co., Ltd., Beijing (CN)

(72) Inventors: Tingliang Liu, Beijing (CN); Yao Huang, Beijing (CN); Xiangdan Dong, Beijing (CN); Xilei Cao, Beijing (CN); Dongfang Yang, Beijing (CN); Xing Yao, Beijing (CN); Lianbin Liu, Beijing (CN); Yang Wang, Beijing (CN)

(73) Assignees: Chengdu BOE Optoelectronics Technology Co., Ltd., Sichuan (CN); BOE Technology Group Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/690,449

(22) PCT Filed: Jun. 20, 2023

(86) PCT No.: PCT/CN2023/101414
§ 371 (c)(1),
(2) Date: Mar. 8, 2024

(87) PCT Pub. No.: WO2024/259590
PCT Pub. Date: Dec. 26, 2024

(65) Prior Publication Data
US 2025/0232728 A1 Jul. 17, 2025

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0819* (2013.01);
(Continued)

(58) Field of Classification Search
CPC ............... G09G 3/3266; G09G 3/3233; G09G 2300/0819; G09G 2300/0842;
(Continued)

(56) References Cited

U.S. PATENT DOCUMENTS

2008/0218465 A1* 9/2008 Tsou .................... G09G 3/3659 345/92
2009/0231239 A1* 9/2009 Goden ................ G09G 3/3233 345/76

(Continued)

FOREIGN PATENT DOCUMENTS

CN 111091792 A 5/2020
CN 111445831 A 7/2020

(Continued)

OTHER PUBLICATIONS

International Search Report & Written Opinion mailed Dec. 19, 2023, regarding PCT/CN2023/101414.

*Primary Examiner* — Tom V Sheng
(74) *Attorney, Agent, or Firm* — Intellectual Valley Law, P.C.

(57) ABSTRACT

A display apparatus includes a plurality of rows of subpixels, a first scan circuit, and a second scan circuit. The first scan circuit includes a plurality of first scan units and a plurality of second scan units alternately arranged. The second scan circuit includes a plurality of third scan units. A respective first scan unit and a respective second scan unit are configured to provide control signals to two adjacent rows of subpixels, respectively. A respective third scan unit is configured to provide control signals to the first adjacent row of
(Continued)

subpixels and the second adjacent row of subpixels. Control signals output from the respective first scan unit are out of phase with respect to control signals output from the respective second scan unit. A first duration of an effective voltage of a first control signal output from the respective first scan unit is greater than a second duration of an effective voltage of a second control signal output from the respective second scan unit.

20 Claims, 19 Drawing Sheets

(52) U.S. Cl.
CPC ............... *G09G 2300/0842* (2013.01); *G09G 2300/0861* (2013.01); *G09G 2310/08* (2013.01); *G09G 2320/0223* (2013.01); *G09G 2320/0233* (2013.01)

(58) Field of Classification Search
CPC ....... G09G 2300/0861; G09G 2310/08; G09G 2320/0223; G09G 2320/0233
USPC .......................................................... 345/694
See application file for complete search history.

(56) References Cited

U.S. PATENT DOCUMENTS

| | | | | |
|---|---|---|---|---|
| 2011/0115835 | A1 | 5/2011 | Lee | |
| 2015/0279274 | A1 | 10/2015 | Pyo | |
| 2017/0092199 | A1 | 3/2017 | Park et al. | |
| 2017/0243557 | A1* | 8/2017 | Yoon .................... | G09G 3/3677 |
| 2018/0190224 | A1 | 7/2018 | Kim et al. | |
| 2019/0333433 | A1 | 10/2019 | Zhu et al. | |
| 2020/0090600 | A1* | 3/2020 | Calayir ................ | G09G 3/3611 |
| 2021/0312868 | A1 | 10/2021 | Kim et al. | |
| 2022/0036789 | A1* | 2/2022 | Guo .......................... | G09G 3/20 |
| 2022/0036841 | A1* | 2/2022 | Guo ...................... | G09G 3/3674 |
| 2024/0135850 | A1* | 4/2024 | Lin ...................... | G09G 3/3677 |

FOREIGN PATENT DOCUMENTS

| | | | |
|---|---|---|---|
| CN | 112435622 | A | 3/2021 |
| CN | 114822442 | A | 7/2022 |
| CN | 115188309 | A | 10/2022 |
| JP | 2018045186 | A | 3/2018 |

* cited by examiner

DISPLAY APPARATUS

CROSS-REFERENCE TO RELATED APPLICATION

This application is a national stage application under 35 U.S.C. § 371 of International Application No. PCT/CN2023/101414, filed Jun. 20, 2023, the contents of which are incorporated by reference in the entirety.

TECHNICAL FIELD

The present invention relates to display technology, more particularly, to a display apparatus.

BACKGROUND

Image display apparatuses include a driver for controlling image display in each of a plurality of pixels. The driver is a transistor-based circuit including a gate driving circuit and a data driving circuit. The gate driving circuit is formed by cascading multiple units of shift register units. Each shift register unit outputs a gate driving signal to one of a plurality of gate lines. The gate driving signals from the gate driving circuit scan through gate lines row by row, controlling each row of transistors to be in on/off states. The gate drive circuit can be integrated into a gate-on-array (GOA) circuit, which can be formed directly in the array substrate of the display panel.

SUMMARY

In one aspect, the present disclosure provides a display apparatus, comprising a display area having a plurality of rows of subpixels, and one or more scan circuits configured to provide control signals to the plurality of rows of subpixels; wherein the one or more scan circuits comprise a first scan circuit and a second scan circuit; the first scan circuit comprises a plurality of first scan units and a plurality of second scan units alternately arranged; a respective first scan unit of the plurality of first scan units and a respective second scan unit of the plurality of second scan units are configured to provide control signals to two adjacent rows of subpixels, respectively; control signals output from the respective first scan unit and provided to a first adjacent row of subpixels are out of phase with respect to control signals output from the respective second scan unit and provided to a second adjacent row of subpixels; the second scan circuit comprises a plurality of third scan units; a respective third scan unit of the plurality of third scan units is configured to provide control signals to the first adjacent row of subpixels and the second adjacent row of subpixels; control signals output from the respective third scan unit and provided to the first adjacent row of subpixels are in-phase with respect to control signals output from the respective third scan unit and provided to the second adjacent row of subpixels; and a first duration of an effective voltage of a first control signal output from the respective first scan unit is greater than a second duration of an effective voltage of a second control signal output from the respective second scan unit.

Optionally, the respective first scan unit is configured to provide gate scanning signals to data write transistors in pixel driving circuits in the first adjacent row of subpixels; the respective second scan unit is configured to provide gate scanning signals to data write transistors in pixel driving circuits in the second adjacent row of subpixels; and the respective third scan unit is configured to provide gate scanning signals to compensating transistors in pixel driving circuits in the first adjacent row of subpixels and in the second adjacent row of subpixels.

Optionally, compensating durations for compensating threshold voltages of driving transistors in pixel driving circuits in the two adjacent rows of subpixels and in a same column of subpixels are different from each other.

Optionally, the display apparatus comprises K number of rows of subpixels, K being an integer greater than 1; wherein the K number of rows of subpixels comprise a (2k−1)-th row of subpixels and a (2k)-th row of subpixels, 1≤k≤(K/2), k being an integer; the respective first scan unit is configured to provide control signals to the (2k−1)-th row of subpixels; the respective second scan unit is configured to provide control signals to the (2k)-th row of subpixels; the respective third scan unit is configured to provide control signals to the (2k−1)-th row of subpixels and the (2k)-th row of subpixels; control signals output from the respective first scan unit and provided to the (2k−1)-th row of subpixels are out of phase with respect to control signals output from the respective second scan unit and provided to the (2k)-th row of subpixels; and control signals output from the respective third scan unit and provided to the (2k−1)-th row of subpixels are in-phase with respect to control signals output from the respective third scan unit and provided to the (2k)-th row of subpixels.

Optionally, the respective first scan unit is configured to provide gate scanning signals to data write transistors in pixel driving circuits in the (2k−1)-th row of subpixels; the respective second scan unit is configured to provide gate scanning signals to data write transistors in pixel driving circuits in the (2k)-th row of subpixels; and the respective third scan unit is configured to provide gate scanning signals to compensating transistors in pixel driving circuits in the (2k−1)-th row of subpixels and in the (2k)-th row of subpixels.

Optionally, compensating durations for compensating threshold voltages of driving transistors in pixel driving circuits in a same column of subpixels, and in the (2k−1)-th row of subpixels and in the (2k)-th row of subpixels, respectively, are different from each other.

Optionally, a first compensation duration for compensating threshold voltages of driving transistors in pixel driving circuits in the (2k−1)-th row of subpixels and in a same column of subpixels is greater than a second compensation duration for compensating threshold voltages of driving transistors in pixel driving circuits in the (2k)-th row of subpixels and in the same column of subpixels; and a first luminance value of a first subpixel in the (2k−1)-th row of subpixels and in the same column of subpixels is substantially the same as a second luminance value of a second subpixel in the (2k)-th row of subpixels and in the same column of subpixels, when data signals of a same voltage are applied to the first subpixel and the second subpixel, respectively.

Optionally, output of the first control signal front the respective first scan unit is controlled by a second clock signal; output of the second control signal from the respective second scan unit is controlled by a first clock signal; a duration of an effective voltage of the second clock signal is greater than a duration of an effective voltage of the first clock signal.

Optionally, the first control signal output from the respective first scan unit is a second clock signal; the second control signal output from the respective second scan unit is a first clock signal; and a duration of an effective voltage of the second clock signal is greater than a duration of an effective voltage of the first clock signal.

Optionally, the first duration of the effective voltage of the first control signal output from the respective first scan unit is controlled by a second clock signal; and the second duration of the effective voltage of the second control signal output from the respective second scan unit is controlled by a first clock signal.

Optionally, the first duration of the effective voltage of the first control signal output from the respective first scan unit is substantially the same as a duration of an effective voltage of a second clock signal; and the second duration of the effective voltage of the second control signal output from the respective second scan unit is substantially the same as a duration of an effective voltage of a first clock signal.

Optionally, the display apparatus further comprises an integrated circuit configured to provide a first clock signal and a second clock signal to the first scan circuit; a first clock signal line connecting the integrated circuit with the respective first scan unit or the respective second scan unit, and configured to provide the first clock signal to the respective first scan unit or the respective second scan unit; a second clock signal line connecting the integrated circuit with the respective first scan unit or the respective second scan unit, and configured to provide the second clock signal to the respective first scan unit or the respective second scan unit; and a resistance-capacitance loading of the first clock signal line is greater than a resistance-capacitance loading of the second clock signal line by 0.1% to 20%.

Optionally, the display apparatus further comprises a resistor and/or a capacitor in the first clock signal line so that a resistance loading and/or a capacitance loading of the first clock signal line is greater than a resistance loading and/or a capacitance loading of the second clock signal line by 0.1% to 20%.

Optionally, the first clock signal line has a first line width; the second clock signal line has a second line width; and the second line width of the second clock signal line is greater than the first line width of the first clock signal line by 0.1% to 20%.

Optionally, the display apparatus further comprises a first output signal line connecting the respective first scan unit with the display area; and a second output signal line connecting the respective second scan unit with the display area; wherein the first output signal line is configured to transmit a first clock signal as a gate scanning signal to the first adjacent row of subpixels; the second output signal line is configured to transmit a second clock signal as a gate scanning signal to the second adjacent row of subpixels; and a resistance-capacitance loading of the first output signal line is greater than a resistance-capacitance loading of the second output signal line by 0.1% to 20%.

Optionally, the display apparatus further comprises a resistor and/or a capacitor in the first output signal line so that a resistance loading and/or a capacitance loading of the first output signal line is greater than a resistance loading and/or a capacitance loading of the second output signal line by 0.1% to 20%.

Optionally, the first output signal line has a third line width; the second output signal line has a fourth line width; and the fourth line width of the second output signal line is greater than the third line width of the first output signal line by 0.1% to 20%.

Optionally, the display apparatus further comprises an integrated circuit configured to provide a first clock signal and a second clock signal to the first scan circuit; a first clock signal line connecting the integrated circuit with the respective first scan unit or the respective second scan unit, and configured to provide the first clock signal to the respective first scan unit or the respective second scan unit; a second clock signal line connecting the integrated circuit with the respective first scan unit or the respective second scan unit, and configured to provide the second clock signal to the respective first scan unit or the respective second scan unit; and wherein the integrated circuit comprises a first internal signal line configured to output the first clock signal to the first clock signal line, and a second internal signal line configured to output the second clock signal to the second clock signal line; and a resistance-capacitance loading of the first internal signal line is greater than a resistance-capacitance loading of the second internal signal line by 0.1% to 20%.

Optionally, the display apparatus further comprises a resistor and/or a capacitor in the first internal signal line so that a resistance loading and/or a capacitance loading of the first, internal signal line is greater than a resistance loading and/or a capacitance loading of the second internal signal line by 0.1% to 20%.

Optionally, the one or more scan circuits further comprises a third scan circuit, a fourth scan circuit, and a fifth scan circuit; a respective stage of cascaded scan unit of a plurality of stages of cascaded scan units of the third scan circuit is configured to provide control signals to multiple rows of subpixels; a respective stage of cascaded scan unit of a plurality of stages of cascaded scan units of the fourth scan circuit is configured to provide control signals to multiple rows of subpixels; a respective stage of cascaded scan unit of a plurality of stages of cascaded scan units of the fifth scan circuit is configured to provide control signals to multiple rows of subpixels; the fourth scan circuit is a first reset control signal generating circuit configured to generate first reset control signals for a plurality of first reset control signal lines; the third scan circuit is a second reset control signal generating circuit configured to generate second reset control signals for a plurality of second reset control signal lines; and the fifth scan circuit is a light emitting control signal generating circuit configured to generate light emitting control signals for a plurality of light emitting control signal lines.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
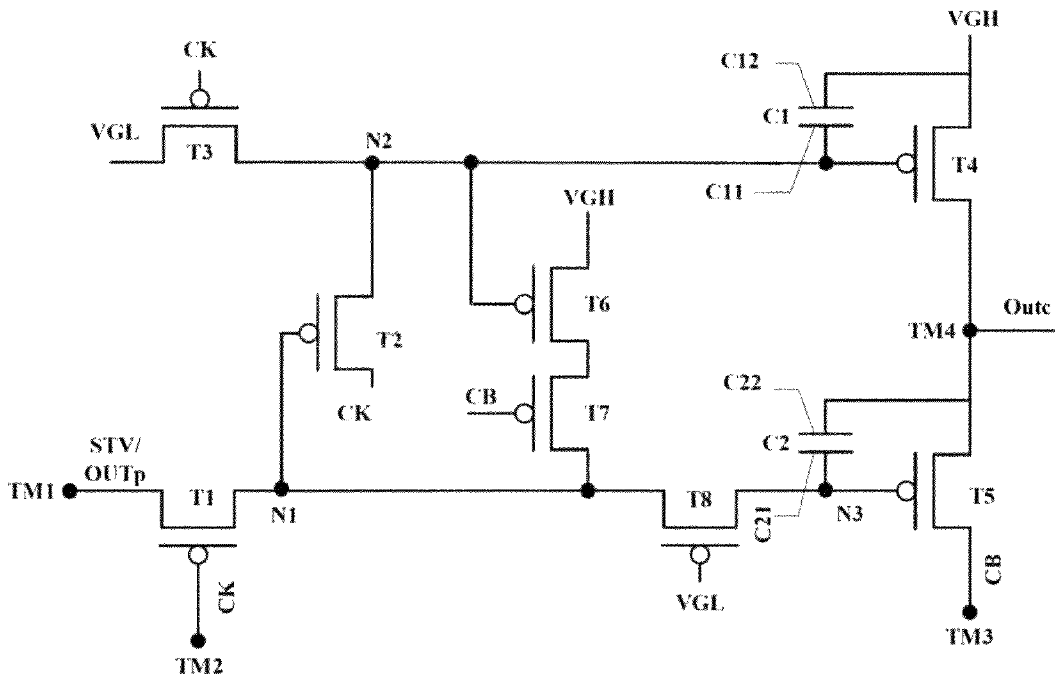
FIG. 1 is a circuit diagram of a respective scan unit of a scan circuit in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a display apparatus that substantially obviate one or more of the problems due to limitations and disadvantages of the related art. In some embodiments, the display apparatus includes a display area having a plurality of rows of subpixels, and one or more scan circuits configured to provide control signals to the plurality of rows of subpixels. Optionally, the one or more scan circuits comprise a first scan circuit and a second scan circuit. Optionally, the first scan circuit comprises a plurality of first scan units and a plurality of second scan units alternately arranged. Optionally, a respective first scan unit of the plurality of first scan units and a respective second scan unit of the plurality of second scan units are configured to provide control signals to two adjacent rows of subpixels, respectively. Optionally, control signals output from the respective first scan unit and provided to a first adjacent row of subpixels are out of phase with respect to control signals output from the respective second scan unit and provided to a second adjacent row of subpixels. Optionally, the second scan circuit comprises a plurality of third scan units. Optionally, a respective third scan unit of the plurality of third scan units is configured to provide control signals to the first adjacent row of subpixels and the second adjacent row of subpixels. Optionally, control signals output from the respective third scan unit and provided to the first adjacent row of subpixels are in-phase with respect to control signals output from the respective third scan unit and provided to a second adjacent row of subpixels. Optionally, a first duration of an effective voltage of a first control signal output from the respective first scan unit is greater than a second duration of an effective voltage of a second control signal output from the respective second scan unit.

In some embodiments, the present disclosure provides one or more scan circuits. A respective scan circuit of the one or more scan circuits includes a plurality of stages of cascaded scan units. Optionally, the plurality of stages of cascaded scan units are configured to provide a plurality of control signals (e.g., gate scanning signals, reset control signals, or light emission control signals) to a plurality of rows of subpixels. Examples of scan circuits include a light emitting control signal generating circuit configured to generate light emitting control signals for subpixels in the array substrate, a reset control signal generating circuit configured to generate reset control signals for subpixels in the array substrate, and a gate scanning signal generating circuit configured to generate gate scanning signals for subpixels in the array substrate.

FIG. 1 is a circuit diagram of a respective scan unit of a scan circuit in some embodiments according to the present disclosure. Referring to FIG. 1, the respective scan unit in some embodiments includes a first transistor T1 to an eighth transistor T8, a first capacitor C1 and a second capacitor C2. In some embodiments, a gate electrode of the first transistor T1 is electrically connected to a second terminal TM2 configured to provide a first clock signal CK, a first electrode of the first transistor T1 is electrically connected to an input terminal TM1 configured to provide a start signal STV or an output signal Outp from an output terminal of a previous scan unit, a second electrode of the first transistor T1 is electrically connected to a first node N1; a gate electrode of the second transistor T2 is electrically connected to the first node N1, a first electrode of the second transistor T2 is electrically connected to the second terminal TM2 configured to provide the first clock signal CK, the second electrode of the second transistor T2 is electrically connected to a second node N2; a gate electrode of the third transistor T3 is electrically connected to the second terminal TM2 configured to provide the first clock signal CK, a first electrode of the third transistor T3 is electrically connected to a first power supply signal VOL, a second electrode of the third transistor T3 is electrically connected to the second node N2; a gate electrode of the fourth transistor T4 is electrically connected to the second node N2, a first electrode of the fourth transistor T4 is electrically connected to a second power supply signal VGH, a second electrode of the fourth transistor T4 is electrically connected to an output terminal TM4 configured to output an output signal Outc; a gate electrode of the fifth transistor T5 is electrically connected to a third node N3, a first electrode of the fifth transistor T5 is electrically connected to a third terminal TM3 configured to provide a second clock signal CB, a second electrode of the fifth transistor T5 is electrically connected to the output terminal TM4 configured to output the output signal Oute; a gate electrode of the sixth transistor T6 is electrically connected to the second node N2, a first electrode of the sixth transistor T6 is electrically connected to the second power supply signal VGH, a second electrode of the sixth transistor T6 is electrically connected to a first electrode of a seventh transistor T7; a gate electrode of the seventh transistor T7 is electrically connected to the third terminal TM3 configured to provide the second clock signal CB, a second electrode of the seventh transistor T7 is electrically connected to the first node N1; a gate electrode of the eighth transistor T8 is electrically connected to a first power supply signal VGL, a first electrode of the eighth transistor T8 is electrically connected to the first node N1, a second electrode of the eighth transistor T8 is electrically connected to the third node N3; a first capacitor electrode C11 of a first capacitor C1 is electrically connected to the second node N2, a second capacitor electrode C12 of the first capacitor C1 is electrically connected to the second power supply signal VGH; and a first capacitor electrode C21 of a second capacitor C2 is electrically connected to the third node N3, and a second capacitor electrode C22 of the second capacitor C2 is electrically connected to the output terminal TM4 configured to output the output signal Outc. In one example, the first transistor T1 to the eighth transistor T8 may be a p-type transistor or may be an n-type transistor. In another example, the second power supply signal VGH provides a continuous high level signal and the first power supply signal VGL provides a continuous low level signal.

Figure 2:
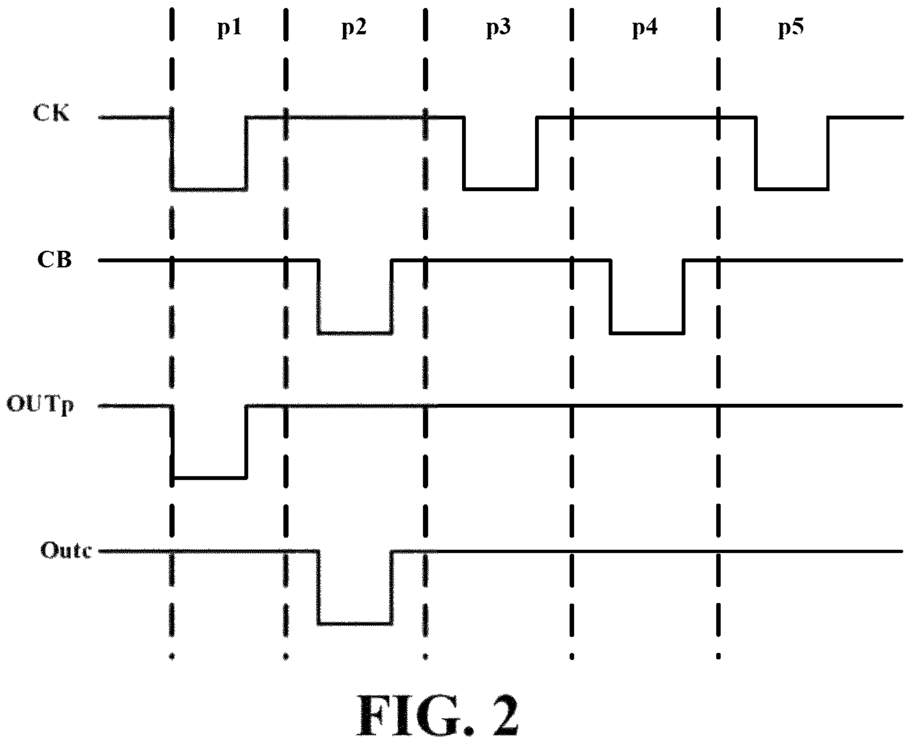
FIG. 2 is a timing diagram illustrating an operation of the respective scan unit illustrated in FIG. 1.

FIG. 2 is a timing diagram illustrating an operation of the respective scan unit illustrated in FIG. 1. Referring to FIG. 2, the operation of the respective scan unit in some embodiments includes a first period p1, a second period p2, a third period p3, a fourth period p4, and a fifth period p5.

In some embodiments, during a first period p1, the first clock signal CK is provided to the second input terminal TM2. The first transistor T1 and the third transistor T3 are turned on. Furthermore, during the first period p1, the second clock signal CB is not provided to the third input terminal TM3, the seventh transistor 17 is turned off.

In some embodiments, during the first period p1, the first transistor T1 is turned on the start signal STV or the output signal Outp from the output terminal of the previous scan unit is provided to the input terminal TM1, and passes from a first electrode of the first transistor T1 to a second electrode of the first transistor T1. The start signal STV or the output signal Outp from the output terminal of the previous scan unit is applied to the first node N1. When the first node N1 is set to the voltage level of the start signal STV or the output signal Outp from the output terminal of the previous scan unit, the second transistor T2 is turned on.

In some embodiments, when the second transistor T2 is turned on, the voltage of the first clock signal CK is provided to the second node N2. The fourth transistor T4 and the sixth transistor T6 are turned on.

In some embodiments, when the third transistor T3 is turned on, the voltage of the first power supply signal VOL is provided to the second node N2. The fourth transistor T4 and the sixth transistor T6 are turned on.

In some embodiments, when the fourth transistor T4 is turned on, the voltage of the second power supply signal VGH is provided to the output terminal TM4. The voltage of the second power supply signal VGH is an ineffective voltage. During the first period p1, an ineffective voltage of the gate driving signal is provided to the n-th stage gate line of N number of stages of gate liens, n and N being positive integers, 1≤n≤N.

In some embodiments, when the first transistor T1 is turned on, the start signal STV or the output signal Outp from the output terminal of the previous scan unit passes through the first transistor T1 and the eighth transistor T8, and the fifth transistor T5 is turned on. During the first period p1, the second clock signal CB is not provided to the third input terminal TM3, and is not provided to the output terminal TM4. During the first period p1, an effective voltage of the gate driving signal is not provided to the n-th stage gate line.

In some embodiments, during a second period p2, the supply of the first clock signal CK to the second input terminal TM2 is interrupted. The first transistor T1 and the third transistor T3 are turned off. The first node N1 maintains the voltage of the preceding period. Since the first node N1 remains in the effective voltage level (e.g., a low voltage level), the second transistor T2 remains turned on. Although the second transistor T2 is turned on, during the second period p2, the supply of the first clock signal CK to the second input terminal TM2 is interrupted. Thus, the fourth transistor T4 and the sixth transistor T6 are turned off. When the fourth transistor T4 is turned off, the voltage of the second power supply signal VGH is not provided to the output terminal TM4.

In some embodiments, during the second period p2, the second clock signal CB is provided to the third input terminal TM3. The seventh transistor T7 is turned on by the second clock signal CB provided to the third input terminal TM3. During the second period p2, the first node N1 maintains the voltage of the preceding period. The voltage (e.g., an effective voltage) at the first node N1 turns on the fifth transistor T5. During the second period p2, the second clock signal CB passes through the fifth transistor T5, is provided to the output terminal TM4, and is provided to the n-th stage gate line as the gate driving signal.

In some embodiments, during a third period p3, the supply of the second clock signal CB to the third input terminal TM3 is interrupted. When the supply of the second clock signal CB is interrupted, the seventh transistor T7 is turned off.

In some embodiments, during the third period p3, the first clock signal CK is provided to the second input terminal TM2. When the first clock signal CK is provided to the second input terminal TM2, the first transistor T1 and the third transistor T3 are turned on. During the third period p3, the start signal STV or the output signal Quip from the output terminal of the previous scan unit is interrupted.

In some embodiments, when the third transistor T3 is turned on, the voltage of the first power supply signal VGL is provided to the second node N2. The fourth transistor T4 and the sixth transistor T6 are turned on. When the fourth transistor T4 is turned on, the voltage of the second power supply signal VGH is provided to the output terminal TM4. The voltage of the second power supply signal VGH is an ineffective voltage. During the third period p3, an ineffective voltage of the gate driving signal is provided to the n-th stage gate line.

During the third period p3, the start signal STV or the output signal Outp from the output terminal of the previous scan unit is interrupted. In some embodiments, when the first transistor T1 is turned on, the first node N1 maintains an ineffective voltage level (e.g., a high voltage level). The fifth transistor T5 is turned off. During the third period p3, the second clock signal CB is not provided to the output terminal TM4, and is not provided to the n-th stage gate line as the gate driving signal.

In some embodiments, during a fourth period p4, the second clock signal CB may be provided to the third input terminal TM3. When the second clock signal CB is provided to the third input terminal TM3, the seventh transistor T7 is turned on. During the fourth period p4, the supply of the first clock signal CK to the second input terminal TM2 is interrupted, the first transistor T1 and the third transistor T3 are turned off. During the fourth period p4, the start signal STV or the output signal Outp from the output terminal of the previous scan unit is interrupted. In some embodiments, when the first transistor T1 is turned off, the first node N1 maintains the voltage of the preceding period. An ineffective voltage at the first node N1 turns off the fifth transistor T5. During the fourth period p4, the second clock signal CB is not provided to the output terminal TM4, and is not provided to the n-th stage gate line as the gate driving signal.

In some embodiments, during a fifth period p5, the supply of the second clock signal CB to the third input terminal TM3 is interrupted, the first clock signal CK is provided to the second terminal TM2. During the fifth period p5, the start signal STV or the output signal Outp from the output terminal of the previous scan unit is interrupted. In some embodiments, when the first transistor T1 is turned on, the first node N1 maintains an ineffective voltage level (e.g., a high voltage level). The fifth transistor T5 is turned off. During the fifth period p5, the second clock signal CB is not provided to the output terminal TM4, and is not provided to the n-th stage gate line as the gate driving signal.

In some embodiments, during the fifth period p5, when the third transistor T3 is turned on, the voltage of the first power supply signal VGL is provided to the second node N2. The fourth transistor T4 and the sixth transistor T6 are turned on. When the fourth transistor T4 is turned on, the voltage of the second power supply signal VGH is provided to the output terminal TM4. The voltage of the second power supply signal VGH is an ineffective voltage. During the fifth period p5, an ineffective voltage of the gate driving signal is provided to the n-th stage gate line.

Figure 3:
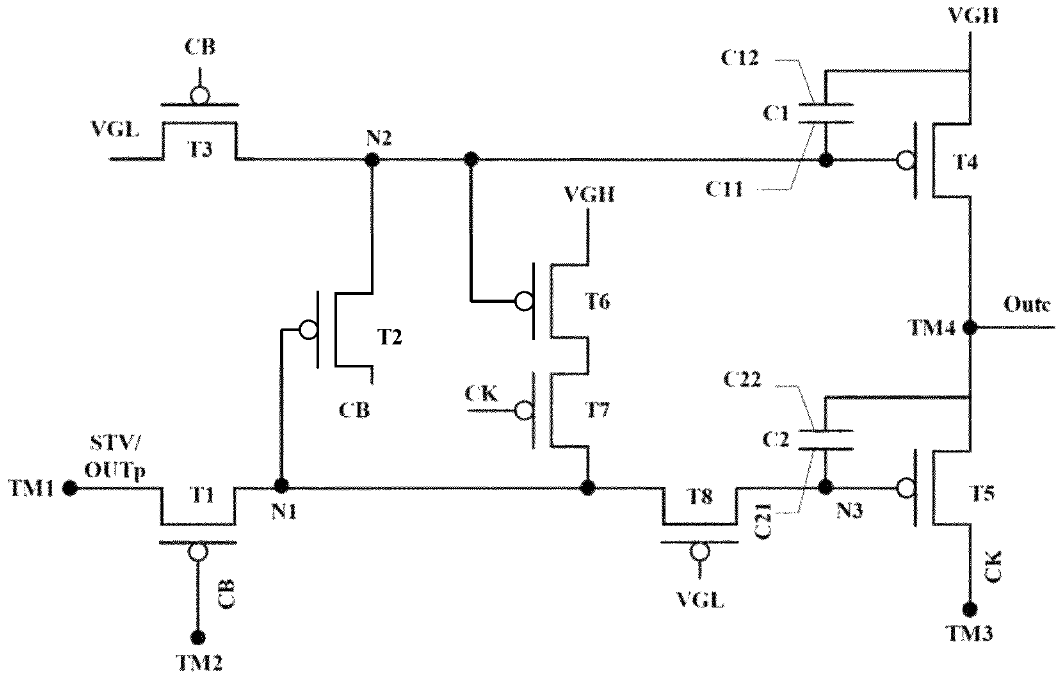
FIG. 3 is a circuit diagram of a respective scan unit of a scan circuit in some embodiments according to the present disclosure.

FIG. 3 is a circuit diagram of a respective scan unit of a scan circuit in some embodiments according to the present disclosure. Referring to FIG. 3, the respective scan unit in some embodiments includes a first transistor T1 to an eighth transistor T8, a first capacitor C1 and a second capacitor C2. In some embodiments, a gate electrode of the first transistor T1 is electrically connected to a second terminal TM2 configured to provide a second clock signal CB, a first electrode of the first transistor T1 is electrically connected to an input terminal TM1 configured to provide a start signal STV or an output signal Outp from an output terminal of a previous scan unit, a second electrode of the first transistor T1 is electrically connected to a first node N1; a gate electrode of the second transistor T2 is electrically connected to the first node N1, a first electrode of the second transistor T2 is electrically connected to the second terminal TM2 configured to provide the second clock signal CB, the second electrode of the second transistor T2 is electrically connected to a second node N2; a gate electrode of the third transistor T3 is electrically connected to the second terminal TM2 configured to provide the second clock signal CB, a first electrode of the third transistor T3 is electrically connected to a first power supply signal VGL, a second electrode of the third transistor T3 is electrically connected to the second node N2; a gate electrode of the fourth transistor T4 is electrically connected to the second node N2, a first electrode of the fourth transistor T4 is electrically connected to a second power supply signal VGH, a second electrode of the fourth transistor T4 is electrically connected to an output terminal TM4 configured to output an output signal Oute; a gate electrode of the fifth transistor T5 is electrically connected to a third node N3, a first electrode of the fifth transistor T5 is electrically connected to a third terminal TM3 configured to provide a first clock signal CK, a second electrode of the fifth transistor T5 is electrically connected to the output terminal TM4 configured to output the output signal Oute; a gate electrode of the sixth transistor T6 is electrically connected to the second node N2, a first electrode of the sixth transistor 16 is electrically connected to the second power supply signal VGH, a second electrode of the sixth transistor T6 is electrically connected to a first electrode of a seventh transistor T7; a gate electrode of the seventh transistor T7 is electrically connected to the third terminal TM3 configured to provide the first clock signal CK, a second electrode of the seventh transistor T7 is electrically connected to the first node N1; a gate electrode of the eighth transistor T8 is electrically connected to a first power supply signal VGL, a first electrode of the eighth transistor T8 is electrically connected to the first node N1, a second electrode of the eighth transistor T8 is electrically connected to the third node N3; a first capacitor electrode C11 of a first capacitor C1 is electrically connected to the second node N2, a second capacitor electrode C12 of the first capacitor C1 is electrically connected to the second power supply signal VGH; and a first capacitor electrode C21 of a second capacitor C2 is electrically connected to the third node N3, and a second capacitor electrode C22 of the second capacitor C2 is electrically connected to the output terminal TM4 configured to output the output signal Outc. In one example, the first transistor T1 to the eighth transistor T8 may be a p-type transistor or may be an n-type transistor. In another example, the second power supply signal VGH provides a continuous high level signal and the first power supply signal VGL provides a continuous low level signal.

Figure 4:
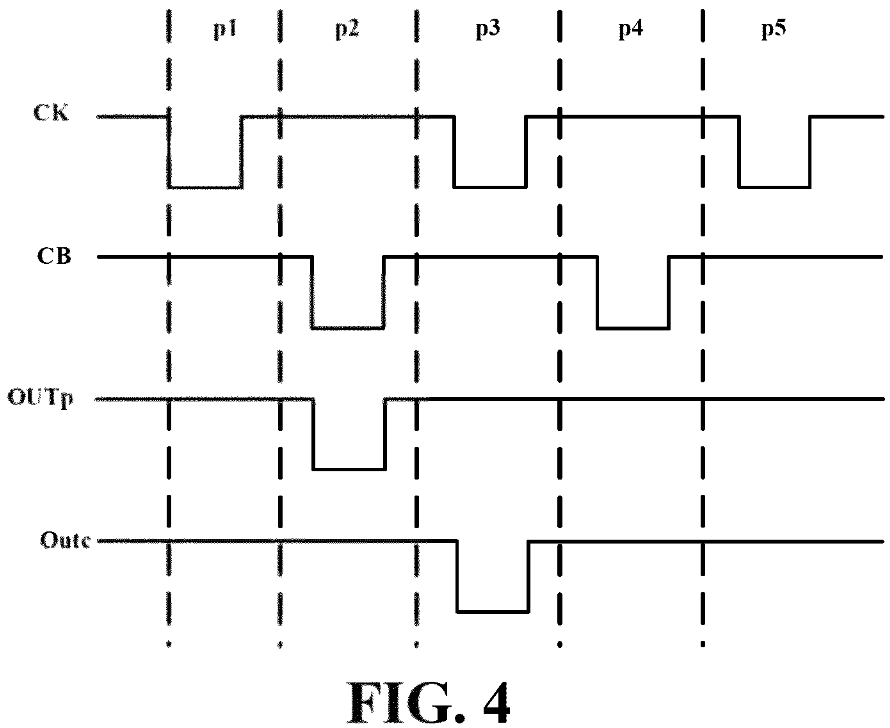
FIG. 4 is a timing diagram illustrating an operation of the respective scan unit illustrated in FIG. 3.

FIG. 4 is a timing diagram illustrating an operation of the respective scan unit illustrated in FIG. 3, Referring to FIG. 4, the operation of the respective scan unit in some embodiments includes a first period p1, a second period p2, a third period p3, a fourth period p4, and a fifth period p5.

In some embodiments, during a first period p1, the second clock signal CB is not provided to the second input terminal TM2. The first transistor T1 and the third transistor T3 are turned off. Furthermore, during the first period p1, the first clock signal CK is provided to the third input terminal TM3, the seventh transistor T7 is turned on.

In some embodiments, during a first period p1, the start signal STV or the output signal Outp from the output terminal of the previous scan unit is not provided to the input terminal TM1. The fifth transistor T5 is turned off. The first clock signal CK does not pass through the fifth transistor T5, an effective voltage of the gate driving signal is not provided to the n-th stage gate line.

In some embodiments, during a first period p1, the third transistor T3 is turned off. The first power supply signal VGL does not pass through the third transistor T3. The fourth transistor T4 is turned off.

In some embodiments, during the second period p2, the supply of the first clock signal CK to the third input terminal TM3 is interrupted. The second clock signal CB is provided to the second input terminal TM2, the first transistor T1 and the third transistor T3 are turned on. The start signal STV or the output signal Outp from the output terminal of the previous scan unit is provided to the input terminal TM1, and passes from a first electrode of the first transistor T1 to a second electrode of the first transistor T1. The start signal STV or the output signal Outp from the output terminal of the previous scan unit is applied to the first node N1. When the first node N1 is set to the voltage level of the start signal STV or the output signal Outp from the output terminal of the previous scan unit, the second transistor T2 is turned on.

In some embodiments, when the second transistor T2 is turned on, the voltage of the second clock signal CB is provided to the second node N2. The fourth transistor T4 and the sixth transistor T6 are turned on.

In some embodiments, when the third transistor T3 is turned on, the voltage of the first power supply signal VGL is provided to the second node N2. The fourth transistor T4 and the sixth transistor T6 are turned on.

In some embodiments, when the fourth transistor T4 is turned on, the voltage of the second power supply signal VGH is provided to the output terminal TM4. The voltage of the second power supply signal VGH is an ineffective voltage. During the second period p2, an ineffective voltage of the gate driving signal is provided to the n-th stage gate line.

In some embodiments, when the first transistor T1 is turned on, the start signal STV or the output signal Outp from the output terminal of the previous scan unit passes through the first transistor T1 and the eighth transistor T8, and the fifth transistor T5 is turned on. During the second period p2, the first clock signal CK is not provided to the third input terminal TM3, and is not provided to the output terminal TM4. During the second period p2, an effective voltage of the gate driving signal is not provided to the n-th stage gate line.

In some embodiments, during a third period p3, the supply of the second clock signal CB to the second input terminal TM2 is interrupted. The first transistor T1 and the third transistor T3 are turned off. The first node N1 maintains the voltage of the preceding period. Since the first node N1 remains in the effective voltage level (e.g., a low voltage level), the second transistor T2 remains turned on. Although the second transistor T2 is turned on, during the third period p3, the supply of the second clock signal CB to the second input terminal TM2 is interrupted. Thus, the fourth transistor T4 and the sixth transistor T6 are turned off. When the fourth transistor T4 is turned off, the voltage of the second power supply signal VGH is not provided to the output terminal TM4.

In some embodiments, during the third period p3, the first clock signal CK is provided to the third input terminal TM3. The seventh transistor T7 is turned on by the first clock signal CK provided to the third input terminal TM3. During the third period p3, the first node N1 maintains the voltage of the preceding period. The voltage (e.g., an effective voltage) at the first node N1 turns on the fifth transistor T5. During the third period p3, the first clock signal CK passes through the fifth transistor T5, is provided to the output terminal TM4, and is provided to the n-th stage gate line as the gate driving signal.

In some embodiments, during a fourth period p4, the supply of the first clock signal CK to the third input terminal TM3 is interrupted. When the supply of the first clock signal CK is interrupted, the seventh transistor T7 is turned off.

In some embodiments, during the fourth period p4, the second clock signal CB is provided to the second input terminal TM2. When the second clock signal CB is provided to the second input terminal TM2, the first transistor T1 and the third transistor T3 are turned on. During the fourth period p4, the start signal STV or the output signal Outp from the output terminal of the previous scan unit is interrupted.

In some embodiments, when the third transistor T3 is turned on, the voltage of the first power supply signal VOL is provided to the second node N2. The fourth transistor T4 and the sixth transistor T6 are turned on. When the fourth transistor T4 is turned on, the voltage of the second power supply signal VGH is provided to the output terminal TM4. The voltage of the second power supply signal VGH is an ineffective voltage. During the fourth period p4, an ineffective voltage of the gate driving signal is provided to the n-th stage gate line.

During the fourth period p4, the start signal STV or the output signal Outp from the output terminal of the previous scan unit is interrupted. In some embodiments, when the first transistor T1 is turned on, the first node N1 maintains an ineffective voltage level (e.g., a high voltage level). The fifth transistor T5 is turned off, During the fourth period p4, the first clock signal CK is not provided to the output terminal TM4, and is not provided to the n-th stage gate line as the gate driving signal.

In some embodiments, during a fifth period p5, the first clock signal CK may be provided to the third input terminal TM3. When the first clock signal CK is provided to the third input terminal TM3, the seventh transistor T7 is turned on. During the fifth period p5, the supply of the second clock signal CB to the second input terminal TM2 is interrupted, the first transistor T1 and the third transistor T3 are turned off. During the fifth period p5, the start signal STV or the output signal Outp from the output terminal of the previous scan unit is interrupted. In some embodiments, when the first transistor T1 is turned off, the first node N1 maintains the voltage of the preceding period. An ineffective voltage at the first node N1 turns off the fifth transistor T5. During the fifth period p5, the first clock signal CK is not provided to the output terminal TM4, and is not provided to the n-th stage gate line as the gate driving signal.

Comparing the respective scan unit depicted in FIG. 1 and FIG. 2 with the respective scan unit depicted in FIG. 3 and FIG. 4, the gate driving signal output from the respective scan unit depicted in FIG. 3 and FIG. 4 is out of phase with respect to the gate driving signal output from the respective scan unit depicted in FIG. 1 and FIG. 2.

The present disclosure may be implemented in scan circuit having transistors of various types, including a scan circuit having p-type transistors, a scan circuit having n-type transistors, and a scan circuit having one or more p-type transistors and one or more n-type transistors. For a p-type transistor, an effective control signal (e.g., a turn-on control signal) is a low voltage signal, and an ineffective control signal (e.g., a turn-off control signal) is a high voltage signal. For an n-type transistor, an effective control signal (e.g., a turn-on control signal) is a high voltage signal, and an ineffective control signal (e.g., a turn-off control signal) is a low voltage signal, Referring to FIG. 1 and FIG. 3, in some embodiments, all transistors in the respective scan unit of the scan circuit are p-type transistors such as polysilicon transistors.

Figure 5:
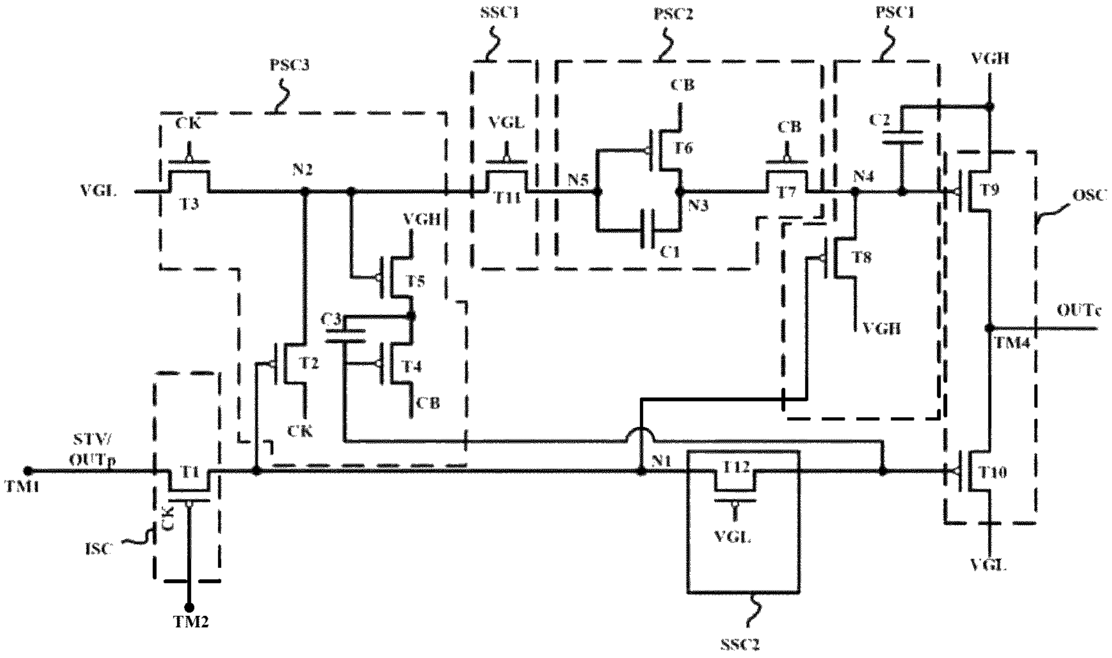
FIG. 5 is a circuit diagram of a respective scan unit of a scan circuit in some embodiments according to the present disclosure.
Figure 6:
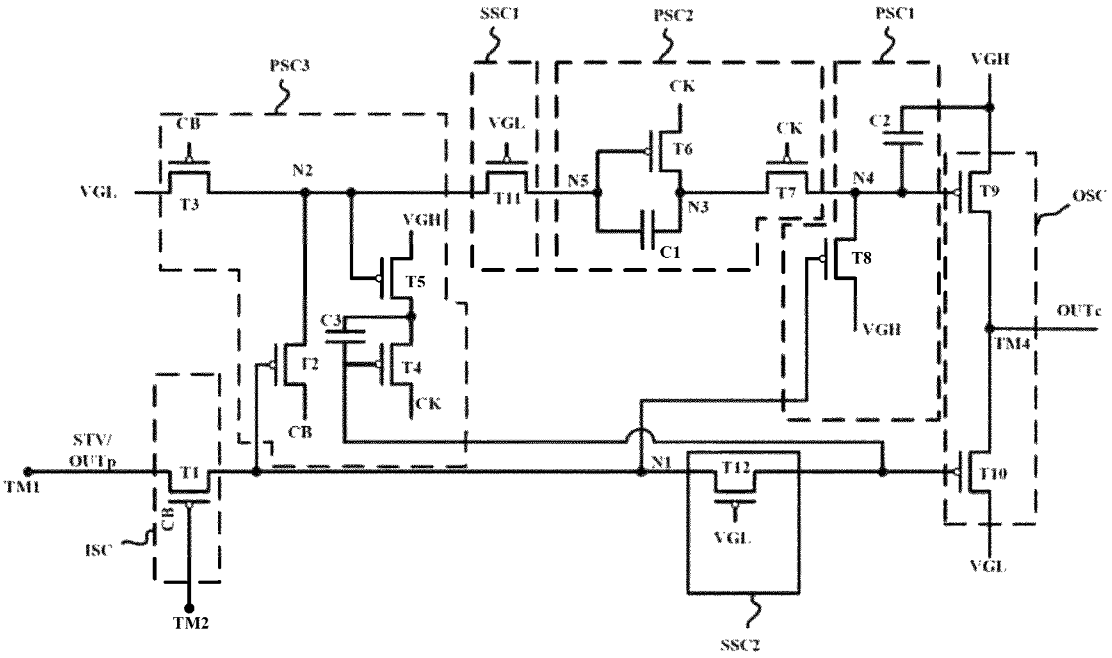
FIG. 6 is a circuit diagram of a respective scan unit of a scan circuit in some embodiments according to the present disclosure.

Various alternative scan circuits may be used in the present disclosure. FIG. 5 is a circuit diagram of a respective scan unit of a scan circuit in some embodiments according to the present disclosure. FIG. 6 is a circuit diagram of a respective scan unit of a scan circuit in some embodiments according to the present disclosure. The respective scan unit depicted in FIG. 5 corresponds to the respective scan unit depicted in FIG. 1 and FIG. 2. The respective scan unit depicted in FIG. 6 corresponds to the respective scan unit depicted in FIG. 3 and FIG. 4. The gate driving signal output from the respective scan unit depicted in FIG. 6 is out of phase with respect to the gate driving signal output from the respective scan unit depicted in FIG. 5.

Referring to FIG. 5, the respective scan unit in some embodiments includes an input subcircuit ISC, an output subcircuit OSC, a first processing subcircuit PSC1, a second processing subcircuit PSC2, a third processing subcircuit PSC3, a first stabilizing subcircuit SSC1, and a second stabilizing subcircuit SSC2.

In some embodiments, the output subcircuit OSC is configured to supply the voltage of a second power supply signal VGH or a first power supply signal VGL to an output terminal TM4 in response to voltages of a fourth node N4. Optionally, the output subcircuit OSC includes a ninth transistor T9 and a tenth transistor T10.

The ninth transistor T9 is coupled between a second power supply signal VGH and the output terminal TM4. A gate electrode of the ninth transistor T9 is coupled to the fourth node N4. The ninth transistor T9 may be turned on or off depending on the voltage of the fourth node N4. Optionally, when the ninth transistor T9 is turned on, the voltage of the second power supply signal VGH is provided to the output terminal TM4, which (annotated as Oute in FIG. 5) may be transmitted to an n-th stage gate line and used as a gate driving signal having a gate-on level.

The tenth transistor T10 is coupled between the output terminal TM4 and a first power supply signal VGL. A gate electrode of the tenth transistor T10 is coupled to the first node N1. The tenth transistor T10 may be turned on or off depending on the voltage of the first node N1. Optionally, when the tenth transistor T10 is turned on, the voltage of the first power supply signal VGL is provided to the output terminal TM4, which (annotated as Oute in FIG. 5) may be provided to an n-th stage gate line and used as a gate driving signal having a gate-off level. In one example, when the gate driving signal has a gate-off' level, it may be understood that the gate driving signal is not provided.

In some embodiments, the input subcircuit ISC is configured to control the voltages of the first node N1 in response to signals provided to the first input terminal TM1 and the second input terminal TM2, respectively. Optionally, the input subcircuit ISC includes a first transistor T1.

The first transistor T1 is coupled between the first input terminal TM1 and the first node N1. A gate electrode of the first transistor T1 is coupled to the second input terminal TM2. When the first clock signal CK is provided to the second input terminal TM2, the first transistor T1 is turned on to electrically couple the first input terminal TM1 with the first node N1.

In some embodiments, the first processing subcircuit PSC1 is configured to control the voltage of the fourth node N4 in response to the voltage of the first node N1. Optionally, the first processing subcircuit PSC1 includes an eighth transistor T8 and a second capacitor C2.

The eighth transistor T8 is coupled between the second power supply signal VGH and the fourth node N4. A gate electrode of the eighth transistor T8 is coupled to the first node N1. The eighth transistor T8 may be turned on or off depending on the voltage of the first node N1. Optionally, when the eighth transistor T8 is turned on, the voltage of the second power supply signal VGH may be provided to the fourth node N4.

The second capacitor C2 is coupled between the second power supply signal VGH and the fourth node N4. Optionally, the second capacitor C2 is configured to charge a voltage to be applied to the fourth node N4. Optionally, the second capacitor C2 is configured to stably maintain the voltage of the fourth node N4.

In some embodiments, the second processing subcircuit PSC2 is coupled to a fifth node N5, and is configured to control the voltage of the fourth node N4 in response to a signal input to the third input terminal TM3. Optionally, the second processing subcircuit PSC2 includes a sixth transistor T6, a seventh transistor T7, and a first capacitor C1.

A first terminal of the first capacitor C1 is coupled to the fifth node N5, and a second terminal of the first capacitor C1 is coupled to a third node N3 that is a common node between the sixth transistor T6 and the seventh transistor T7.

The sixth transistor T6 is coupled between the third node N3 and the fifth node N5. A gate electrode of the sixth transistor T6 is coupled to the fifth node N5. The sixth transistor T6 may be turned on depending on the voltage of the fifth node N5 so that a voltage corresponding to the second clock signal CB provided to the third input terminal TM3 may be applied to the third node N3.

The seventh transistor T7 is coupled between the fourth node N4 and the third node N3. A gate electrode of the seventh transistor T7 is coupled to the third input terminal TM3. The seventh transistor T7 may be turned on in response to the second clock signal CB provided to the third input terminal TM3, and thus, applies the voltage of the second power supply signal VGH to the third node N3.

In some embodiments, the third processing subcircuit PSC3 is configured to control the voltage of the second node N2. Optionally, the third processing subcircuit PSC3 includes a second transistor T2, a third transistor T3, a fourth transistor T4, a fifth transistor T5, and a third capacitor C3.

The fifth transistor T5 is coupled between the second power supply signal VGH and the fourth transistor T4. A gate electrode of the fifth transistor T5 is coupled to the second node N2, The fifth transistor T5 may be turned on or off depending on the voltage of the second node N2.

The fourth transistor T4 is coupled between the fifth transistor T5 and the third input terminal TM3. A first electrode of the fourth transistor T4 is configured to be provided with the second clock signal CB provided to the third input terminal TM3. A gate electrode of the fourth transistor T4 is coupled to the gate electrode of the tenth transistor T10. A second electrode of the fourth transistor T4 is coupled to the second electrode of the fifth transistor T5.

The second transistor T2 is coupled between the second node N2 and the second input terminal TM2. A gate electrode of the second transistor T2 is coupled to the first node N1.

The third transistor T3 is coupled between the second node N2 and the first power supply signal VOL. A gate electrode of the third transistor T3 is coupled to the second input terminal TM2. When the first clock signal CK is provided to the second input terminal TM2, the third transistor T3 may be turned on so that the voltage of the first power supply signal. VGL may be provided to the second node N2.

The third capacitor C3 is coupled between the tenth transistor T10 and the fifth transistor T5. A first capacitor electrode of the third capacitor C3 is coupled to the second electrode of the fifth transistor T5 and the first electrode of the fourth transistor T4, A second capacitor electrode of the third capacitor C3 is coupled to the gate electrode of the fourth transistor T4 and the gate electrode of the tenth transistor T10.

In some embodiments, the first stabilizing subcircuit SSC1 is coupled between the second processing subcircuit PSC2 and the third processing subcircuit PSC3. Optionally, the first stabilizing subcircuit SSC1 is configured to limit a voltage drop width of the second node N2. Optionally, the first stabilizing subcircuit SSC1 includes an eleventh transistor T11.

The eleventh transistor T11 is coupled between the second node N2 and the fifth node N5. A gate electrode of the eleventh transistor T11 is coupled to the first power supply signal VGL. Since the first power supply signal VGL has a gate-on level voltage, the eleventh transistor T11 may always remain turned on. Therefore, the second node N2 and the fifth node N5 may be maintained at the same voltage, and operated as substantially the same node. As used herein, the term "substantially the same" refers to a difference between two values not exceeding 10% of a base value (e.g., one of the two values), e.g., not exceeding 8%, not exceeding 6%, not exceeding 4%, not exceeding 2%, not exceeding 1%, not exceeding 0.5%, not exceeding 0.1%, not exceeding 0.05%, and not exceeding 0.01%, of the base value.

In some embodiments, the second stabilizing subcircuit SSC2 is coupled between the first node N1 and the output subcircuit OSC, Optionally, the second stabilizing subcircuit SSC2 is configured to limit a voltage drop width of the first node N1. Optionally, the second stabilizing subcircuit SSC2 includes a twelfth transistor T12.

The twelfth transistor T12 is coupled between the first node N1 and a gate electrode of the tenth transistor T10. A gate electrode of the twelfth transistor T12 is coupled to the first power supply signal VGL. Since the first power supply signal VGL has a gate-on level voltage, the twelfth transistor T12 may always remain turned on. Therefore, the first node N1 and the gate electrode of the tenth transistor T10 may be maintained at the same voltage.

In some embodiments, referring to FIG. 5, each of the first to twelfth transistors T1 to T12 may be formed of a p-type transistor. In some embodiments, the gate-on voltage of the first to twelfth transistors T1 to T12 may be set to a low level, and the gate-off voltage thereof may be set to a high level.

In alternative embodiments, each of the first to twelfth transistors T1 to T12 may be formed of an n-type transistor. In some embodiments, the gate-on voltage of the first to twelfth transistors T1 to T12 may be set to a high level, and the gate-off voltage thereof may be set to a low level.

Referring to FIG. 6, the respective scan unit in some embodiments includes an input subcircuit ISC, an output subcircuit OSC, a first processing subcircuit PSC1, a second processing subcircuit PSC2, a third processing subcircuit PSC3, a first stabilizing subcircuit SSC1, and a second stabilizing subcircuit SSC2.

In some embodiments, the output subcircuit OSC is configured to supply the voltage of a second power supply signal VGH or a first power supply signal VGL to an output terminal TM4 in response to voltages of a fourth node N4. Optionally, the output subcircuit OSC includes a ninth transistor T9 and a tenth transistor T10.

The ninth transistor T9 is coupled between a second power supply signal VGH and the output terminal TM4. A gate electrode of the ninth transistor T9 is coupled to the fourth node N4. The ninth transistor T9 may be turned on or off depending on the voltage of the fourth node N4. Optionally, when the ninth transistor T9 is turned on, the voltage of the second power supply signal VGH is provided to the output terminal TM4, which (annotated as Oute in FIG. 6) may be transmitted to an n-th stage gate line and used as a gate driving signal having a gate-on level.

The tenth transistor T10 is coupled between the output terminal TM4 and a first power supply signal VGL. A gate electrode of the tenth transistor T10 is coupled to the first node N1. The tenth transistor T10 may be turned on or off depending on the voltage of the first node N1. Optionally, when the tenth transistor T10 is turned on, the voltage of the first power supply signal VGL is provided to the output terminal TM4, which (annotated as Outc in FIG. 6) may be provided to an n-th stage gate line and used as a gate driving signal having a gate-off level. In one example, when the gate driving signal has a gate-off level, it may be understood that the gate driving signal is not provided.

In some embodiments, the input subcircuit ISC is configured to control the voltages of the first node N1 in response to signals provided to the first input terminal TM1 and the second input terminal TM2, respectively. Optionally, the input subcircuit ISC includes a first transistor T1.

The first transistor T1 is coupled between the first input terminal TM1 and the first node N1. A gate electrode of the first transistor T1 is coupled to the second input terminal TM2. When the second clock signal CB is provided to the second input terminal TM2, the first transistor T1 is turned on to electrically couple the first input terminal TM1 with the first node N1.

In some embodiments, the first processing subcircuit PSC1 is configured to control the voltage of the fourth node N4 in response to the voltages of the first node N1. Optionally, the first processing subcircuit PSC1 includes an eighth transistor T8 and a second capacitor C2.

The eighth transistor T8 is coupled between the second power supply signal VGH and the fourth node N4. A gate electrode of the eighth transistor T8 is coupled to the first node N1, The eighth transistor T8 may be turned on or off depending on the voltage of the first node N1. Optionally, when the eighth transistor T8 is turned on, the voltage of the second power supply signal VGH may be provided to the fourth node N4.

The second capacitor C2 is coupled between the second power supply signal VGH and the fourth node N4. Optionally, the second capacitor C2 is configured to charge a voltage to be applied to the fourth node N4. Optionally, the second capacitor C2 is configured to stably maintain the voltage of the fourth node N4.

In some embodiments, the second processing subcircuit PSC2 is coupled to a fifth node N5, and is configured to control the voltage of the fourth node N4 in response to a signal input to the third input terminal TM3, Optionally, the second processing subcircuit PSC2 includes a sixth transistor T6, a seventh transistor T7, and a first capacitor C1.

A first terminal of the first capacitor C1 is coupled to the fifth node N5, and a second terminal of the first capacitor C1 is coupled to a third node N3 that is a common node between the sixth transistor T6 and the seventh transistor T7.

The sixth transistor T6 is coupled between the third node N3 and the fifth node N5. A gate electrode of the sixth transistor T6 is coupled to the fifth node N5. The sixth transistor T6 may be turned on depending on the voltage of the fifth node N5 so that a voltage corresponding to the first clock signal CK provided to the third input terminal TM3 may be applied to the third node N3.

The seventh transistor T7 is coupled between the fourth node N4 and the third node N3. A gate electrode of the seventh transistor T7 is coupled to the third input terminal TM3. The seventh transistor T7 may be turned on in response to the first clock signal CK provided to the third input terminal TM3, and thus, applies the voltage of the second power supply signal VGH to the third node N3.

In some embodiments, the third processing subcircuit PSC3 is configured to control the voltage of the second node N2. Optionally, the third processing subcircuit PSC3 includes a second transistor T2, a third transistor T3, a fourth transistor T4, a fifth transistor T5, and a third capacitor C3.

The fifth transistor T5 is coupled between the second power supply signal VGH and the fourth transistor T4. A gate electrode of the fifth transistor T5 is coupled to the second node N2. The fifth transistor T5 may be turned on or off depending on the voltage of the second node N2.

The fourth transistor T4 is coupled between the fifth transistor T5 and the third input terminal TM3. A first electrode of the fourth transistor T4 is configured to be provided with the first clock signal CK provided to the third input terminal TM3. A gate electrode of the fourth transistor T4 is coupled to the gate electrode of the tenth transistor T10, A second electrode of the fourth transistor T4 is coupled to the second electrode of the fifth transistor T5.

The second transistor T2 is coupled between the second node N2 and the second input terminal TM2. A gate electrode of the second transistor T2 is coupled to the first node N1.

The third transistor T3 is coupled between the second node N2 and the first power supply signal VGL. A gate electrode of the third transistor T3 is coupled to the second input terminal TM2. When the second clock signal CB is provided to the second input terminal TM2, the third transistor T3 may be turned on so that the voltage of the first power supply signal VGL may be provided to the second node N2.

The third capacitor C3 is coupled between the tenth transistor T10 and the fifth transistor T5. A first capacitor electrode of the third capacitor C3 is coupled to the second electrode of the fifth transistor T5 and the second electrode of the fourth transistor T4. A second capacitor electrode of the third capacitor C3 is coupled to the gate electrode of the fourth transistor T4 and the gate electrode of the tenth transistor T10.

In some embodiments, the first stabilizing subcircuit SSC1 is coupled between the second processing subcircuit PSC2 and the third processing subcircuit PSC3, Optionally, the first stabilizing subcircuit SSC1 is configured to limit a voltage drop width of the second node N2. Optionally, the first stabilizing subcircuit SSC1 includes an eleventh transistor TH1.

The eleventh transistor T11 is coupled between the second node N2 and the fifth node N5. A gate electrode of the eleventh transistor T11 is coupled to the first power supply signal VGL. Since the first power supply signal VGL has a gate-on level voltage, the eleventh transistor T11 may always remain turned on. Therefore, the second node N2 and the fifth node N5 may be maintained at the same voltage, and operated as substantially the same node.

In some embodiments, the second stabilizing subcircuit SSC2 is coupled between the first node N1 and the output subcircuit OSC. Optionally, the second stabilizing subcircuit SSC2 is configured to limit a voltage drop width of the first node N1, Optionally, the second stabilizing subcircuit SSC2 includes a twelfth transistor T12.

The twelfth transistor T12 is coupled between the first node N1 and a gate electrode of the tenth transistor T10, A gate electrode of the twelfth transistor T12 is coupled to the first power supply signal VGL. Since the first power supply signal VGL has a gate-on level voltage, the twelfth transistor T12 may always remain turned on. Therefore, the first node N1 and the gate electrode of the tenth transistor T10 may be maintained at the same voltage.

In some embodiments, referring to FIG. 6, each of the first to twelfth transistors T1 to T12 may be formed of a p-type transistor. In some embodiments, the gate-on voltage of the first to twelfth transistors T1 to T12 may be set to a low level, and the gate-off voltage thereof may be set to a high level.

In alternative embodiments, each of the first to twelfth transistors T1 to T12 may be formed of an n-type transistor. In some embodiments, the gate-on voltage of the first to twelfth transistors T1 to T12 may be set to a high level, and the gate-off voltage thereof may be set to a low level.

In some embodiments, the present disclosure provides an array substrate having a plurality of pixel driving circuits and a plurality of light emitting elements. A respective scan circuit of the one or more scan circuits are configured to provide a plurality of control signals (e.g., gate scanning signals, reset control signals, or light emission control signals) to a plurality of rows of pixel driving circuits. Various appropriate pixel driving circuits may be used in the present array substrate. Examples of appropriate driving circuits include 3T1C, 2T1C, 4T1C, 4T2C, 5T2C, 6T1C, 7T1C, 7T2C, 8T1C, and 8T2C, In some embodiments, the respective one of the plurality of pixel driving circuits is an 8T1C driving circuit. Various appropriate light emitting elements may be used in the present array substrate. Examples of appropriate light emitting elements include organic light emitting diodes, quantum dots light emitting diodes, and micro light emitting diodes. Optionally, the light emitting element is micro light emitting diode. Optionally, the light emitting element is an organic light emitting diode including an organic light emitting layer.

Figure 7:
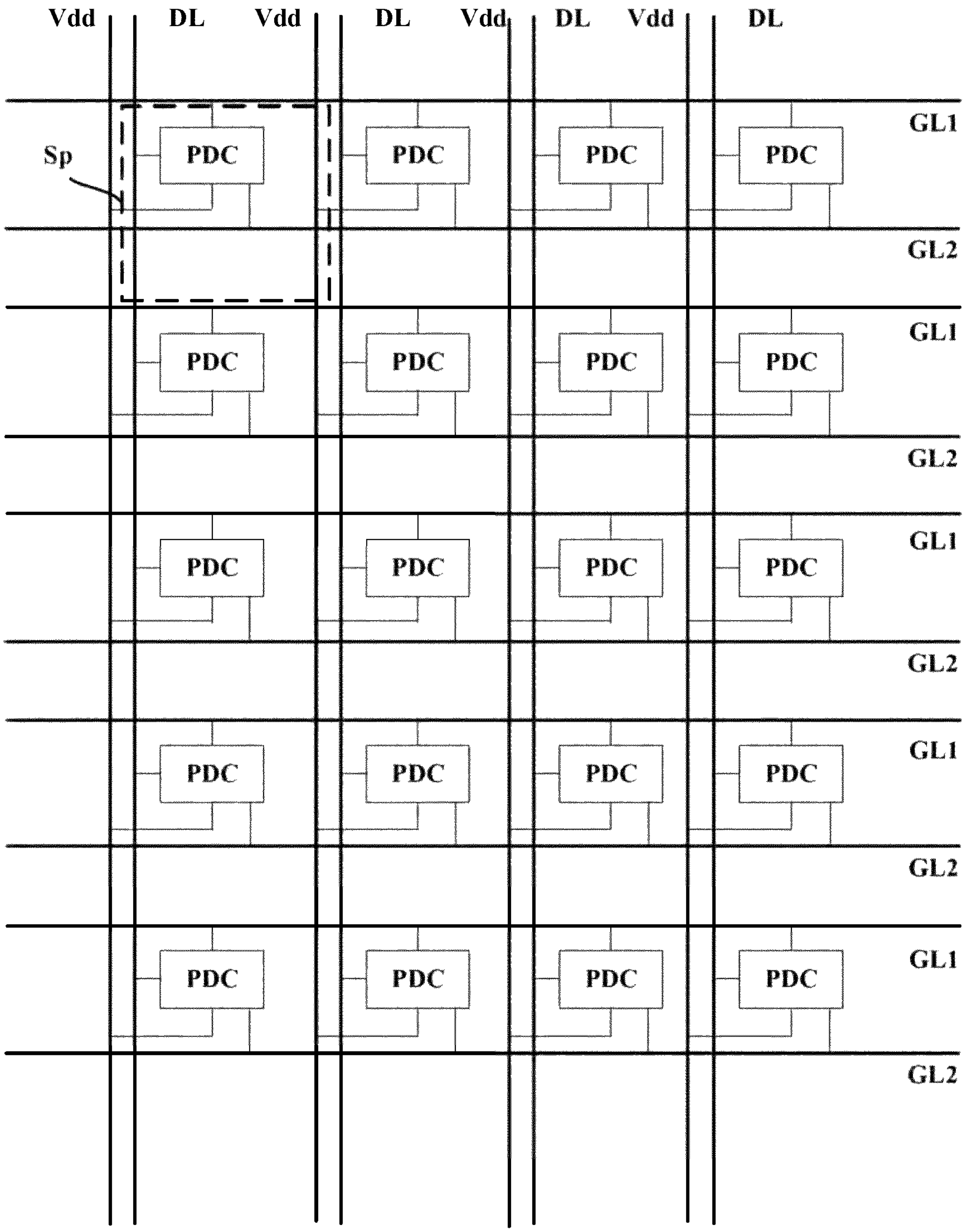
FIG. 7 is a plan view of an array substrate in some embodiments according to the present disclosure.

FIG. 7 is a plan view of an array substrate in some embodiments according to the present disclosure, Referring to FIG. 7, the array substrate includes an array of subpixels Sp. Each subpixel includes an electronic component, e.g., a light emitting element. In one example, the light emitting element is driven by a respective pixel driving circuit PDC. The array substrate includes a plurality of first gate lines (e.g., a respective first gate line GL1), a plurality of second gate lines (e.g., a respective second gate line GL2), a plurality of data lines (e.g., a respective data line DL), a plurality of high voltage supply lines (e.g., a respective high voltage supply line Vdd), and a plurality of low voltage supply lines (e.g., a respective low voltage supply line). Light emission in a respective subpixel Sp is driven by a respective pixel driving circuit PDC. In one example, a high voltage signal (e.g., a VDD signal) is input, through the respective high voltage supply line Vdd of the plurality of high voltage supply line, to the respective pixel driving circuit PDC connected to an anode of the light emitting element; a low voltage signal (e.g., a VSS signal) is input, through a low voltage supply line, to a cathode of the light emitting element. A voltage difference between the high voltage signal (e.g., the VDD signal) and the low voltage signal (e.g., the VSS signal) is a driving voltage $\Delta V$ that drives light emission in the light emitting element.

Figure 8A:
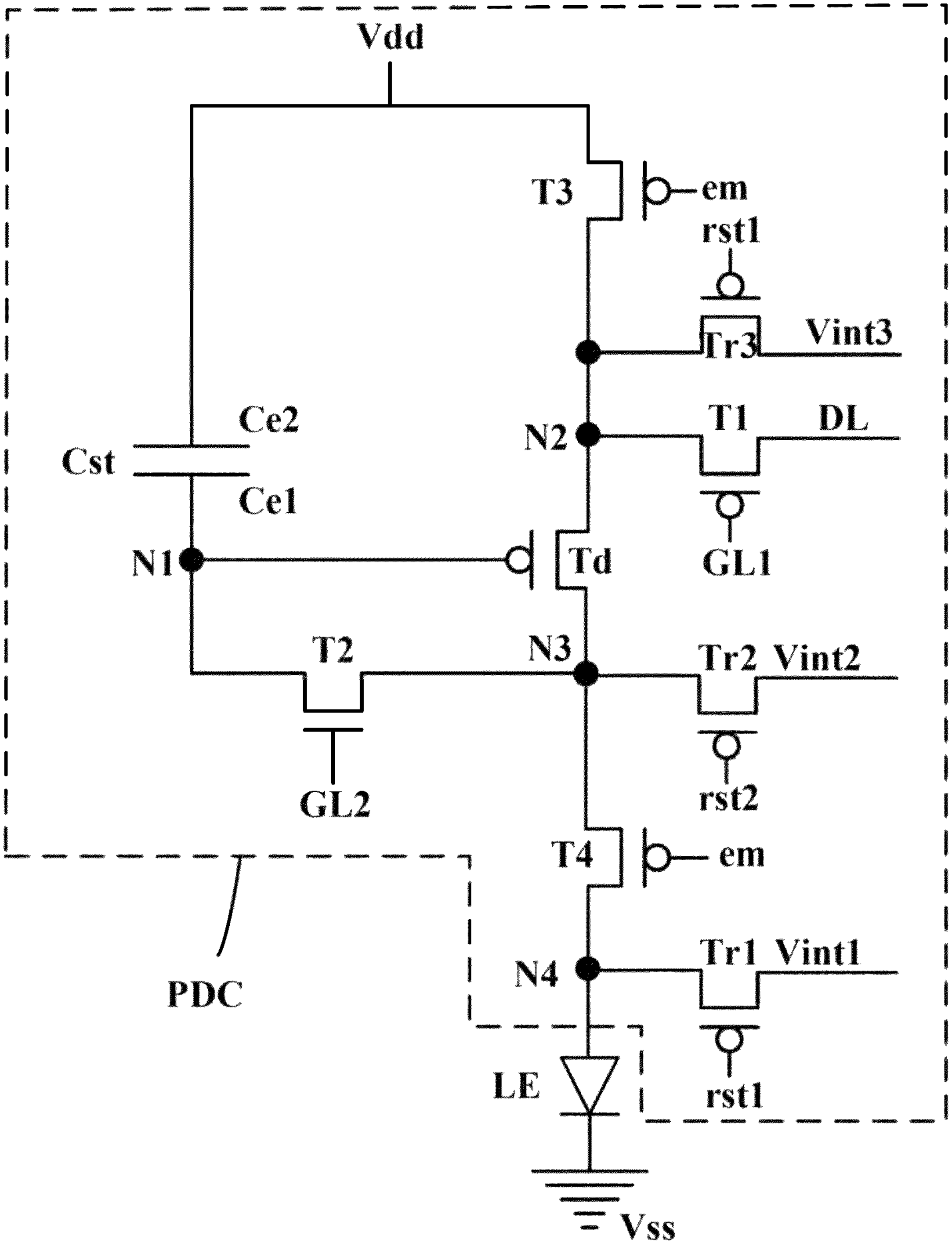
FIG. 8A is a circuit diagram illustrating the structure of a pixel driving circuit in some embodiments according to the present disclosure.

FIG. 8A is a circuit diagram illustrating the structure of a pixel driving circuit in some embodiments according to the present disclosure. Referring to FIG. 8A, in some embodiments, the pixel driving circuit includes a driving transistor Td; a storage capacitor Cst having a first capacitor electrode Ce1 and a second capacitor electrode Ce2; a second reset transistor Tr2 having a gate electrode connected to a respective second reset control signal line rst2 of a plurality of second reset control signal lines, a first electrode connected to a respective second reset signal line Vint2 of a plurality of second reset signal lines, and a second electrode connected to a second electrode of the driving transistor Td; a first transistor T1 having a gate electrode connected to a respective first gate line GL1 of a plurality of first gate lines, a first electrode connected to a respective data line DL of a plurality of data lines, and a second electrode connected to a first electrode of the driving transistor Td; a third reset transistor Tr3 having a gate electrode connected to a respective first reset control signal line rst1 of a plurality of first reset control signal lines, a first electrode connected to a respective third reset signal line Vint3 of a plurality of third reset signal lines, and a second electrode connected to the first electrode of the driving transistor Td; a second transistor T2 having a gate electrode connected to a respective second gate line GL2 of a plurality of second gate lines, a first electrode connected to the first capacitor electrode Ce1 of the storage capacitor Cst and the gate electrode of the driving transistor Td, and a second electrode connected to the second electrode of the driving transistor Td; a third transistor T3 having a gate electrode connected to a respective light emitting control signal line em of a plurality of light emitting control signal lines, a first electrode connected to a respective voltage supply line Vdd of a plurality of voltage supply lines, and a second electrode connected to the first electrode of the driving transistor Td and the second electrode of the first transistor T1; a fourth transistor T4 having a gate electrode connected to the respective light emitting control signal line em of the plurality of light emitting control signal lines, a first electrode connected to second electrodes of the driving transistor Td and the second transistor T2, and a second electrode connected to an anode of a light emitting element LE; and a first reset transistor Tr1 having a gate electrode connected to the respective first reset control signal line rst1 of a plurality of first reset control signal lines, a first electrode connected to a respective first reset signal line Vint1 of a plurality of first reset signal lines, and a second electrode connected to the second electrode of the fourth transistor T4 and the anode of the light emitting element LE. The second capacitor electrode Ce2 is connected to the respective voltage supply line and the first electrode of the third transistor T3.

In some embodiments, the pixel driving circuit includes a driving transistor Td, a data write transistor (e.g., the first transistor T1), a compensating transistor (e.g., the second transistor T2), two light emitting control transistors (e.g., the third transistor T3 and the fourth transistor T4), and three reset transistors (e.g., the first reset transistor Tr1, the second reset transistor Tr2, and the third reset transistor Tr3).

As used herein, a first electrode or a second electrode refers to one of a first terminal and a second terminal of a transistor, the first terminal and the second terminal being connected to an active layer of the transistor. A direction of a current flowing through the transistor may be configured to be from a first electrode to a second electrode, or from a second electrode to a first electrode. Accordingly, depending on the direction of the current flowing through the transistor, in one example, the first electrode is configured to receive an input signal and the second electrode is configured to output an output signal; in another example, the second electrode is configured to receive an input signal and the first electrode is configured to output an output signal.

The pixel driving circuit further include a first node N1, a second node N2, a third node N3, and a fourth node N4. The first node N1 is connected to the gate electrode of the driving transistor Td, the first capacitor electrode Ce1, and the first electrode of the second transistor T2. The second node N2 is connected to the second electrode of the third transistor T3, the second electrode of the first transistor T1, the second electrode of the third reset transistor Tr3, and the first electrode of the driving transistor Td. The third node N3 is connected to the second electrode of the driving transistor Td, the second electrode of the second transistor T2, the first electrode of the fourth transistor T4, and the second electrode of the second reset transistor Tr2. The fourth node N4 is connected to the second electrode of the fourth transistor T4, the second electrode of the first reset transistor Tr1, and the anode of the light emitting element LE.

The array substrate in some embodiments includes a plurality of subpixels. In some embodiments, the plurality of subpixels includes a respective first subpixel, a respective second subpixel, and a respective third subpixel. Optionally, a respective pixel of the array substrate includes the respective first subpixel, the respective second subpixel, and the respective third subpixel. The plurality of subpixels in the array substrate are arranged in an array. In one example, the array of the plurality of subpixels includes a S1-S2-S3 format repeating array, in which S1 stands for the respective first subpixel, S2 stands for the respective second subpixel, and S3 stands for the respective third subpixel. In another example, the S1-S2-S3 format is a C1-C2-C3 format, in which C1 stands for the respective first subpixel of a first color, C2 stands for the respective second subpixel of a second color, and C3 stands for the respective third subpixel of a third color. In another example, the C1-C2-C3 format is an R-G-B format, in which the respective first subpixel is a red subpixel, the respective second subpixel is a green subpixel, and the respective third subpixel is a blue subpixel.

In another example, the array of the plurality of subpixels includes a S1-S2-S3-S4 format repeating array, in which S1 stands for the respective first subpixel, S2 stands for the respective second subpixel, S3 stands for the respective third subpixel, and S4 stands for the respective fourth subpixel. In another example, the S1-S2-S3-S4 format is a C1-C2-C3-C4 format, in which C1 stands for the respective first subpixel of a first color, C2 stands for the respective second subpixel of a second color, C3 stands for the respective third subpixel of a third color, and CA stands for the respective fourth subpixel of a fourth color. In another example, the S1-S2-S3-S4 format is a C1-C2-C3-C2' format, in which C1 stands for the respective first subpixel of a first color, C2 stands for the respective second subpixel of a second color, C3 stands for the respective third subpixel of a third color, and C2' stands for the respective fourth subpixel of the second color. In another example, the C1-C2-C3-C2" format is a R-G-B-G format, in which the respective first subpixel is a red subpixel, the respective second subpixel is a green subpixel, the respective third subpixel is a blue subpixel, and the respective fourth subpixel is a green subpixel.

In some embodiments, a minimum repeating unit of the plurality of subpixels of the array substrate includes the respective first subpixel, the respective second subpixel, and the respective third subpixel. Optionally, each of the respective first subpixel, the respective second subpixel, and the respective third subpixel, includes the first transistor T1, the second transistor T2, the third transistor T3, the fourth transistor T4, the first reset transistor Tr1, the second reset transistor Tr2, the third reset transistor Tr3, the driving transistor Td, and the storage capacitor Cst.

In alternative embodiments, a minimum repeating unit of the plurality of subpixels of the array substrate includes a respective first subpixel, a respective second subpixel, a respective third subpixel, and a respective fourth subpixel. Optionally, each of the respective first subpixel, the respective second subpixel, the respective third subpixel, and the respective fourth subpixel, includes the first transistor T1, the second transistor T2, the third transistor T3, the fourth transistor T4, the first reset transistor Tr1, the second reset transistor Tr2, the third reset transistor Tr3, the driving transistor Td, and the storage capacitor Cst.

The present disclosure may be implemented in pixel driving circuit having transistors of various types, including a pixel driving circuit having p-type transistors, a pixel driving circuit having n-type transistors, and a pixel driving circuit having one or more p-type transistors and one or more n-type transistors. Referring to FIG. 8A, the second transistor T2 is an n-type transistor such as a metal oxide transistor, and other transistors are p-type transistors such as polysilicon transistors. For a p-type transistor, an effective control signal (e.g., a turn-on control signal) is a low voltage signal, and an ineffective control signal (e.g., a turn-off control signal) is a high voltage signal. For an n-type transistor, an effective control signal (e.g., a turn-on control signal) is a high voltage signal, and an ineffective control signal (e.g., a turn-off control signal) is a low voltage signal.

Figure 8B:
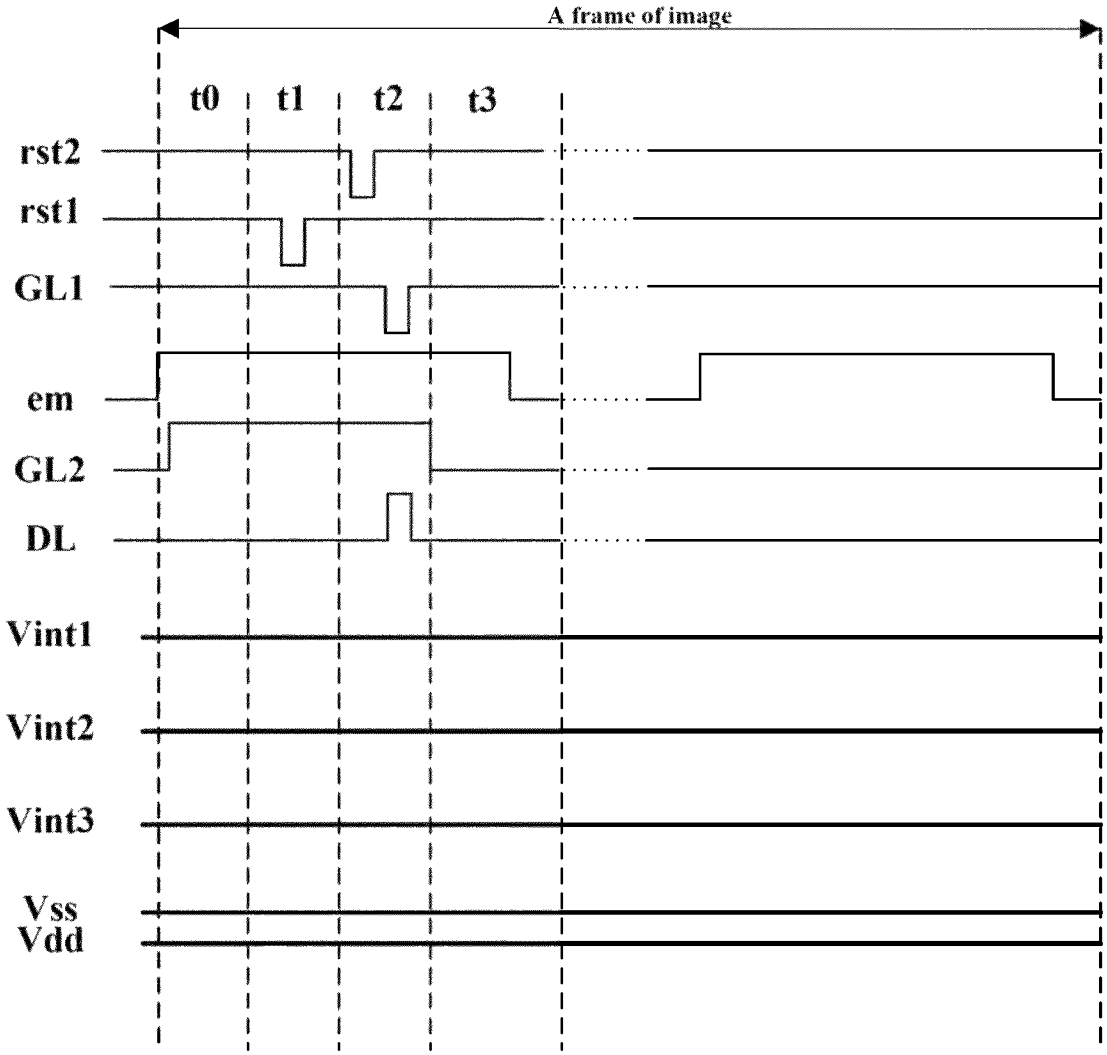
FIG. 8B is a timing diagram illustrating the operation of a pixel driving circuit in some embodiments according to the present disclosure.

FIG. 8B is a timing diagram illustrating the operation of a pixel driving circuit in some embodiments according to the present disclosure. Referring to FIG. 8A and FIG. 8B, during one frame of image, the operation of the pixel driving circuit includes a reset sub-phase t1, a data write sub-phase t2, and a light emitting sub-phase t3. In the initial sub-phase 10, a turning-off reset control signal is provided through the respective second reset control signal line rst2 to the gate electrode of the second reset transistor Tr2 to turn off the second reset transistor Tr2. A turning-off reset control signal is provided through the respective first reset control signal line rst1 to the gate electrode of the first reset transistor Tr1 and the gate electrode of the third reset transistor Tr3 to turn off the first reset transistor Tr1 and the third reset transistor Tr3. In the initial sub-phase to, the respective first gate line GL1 is provided with a turning-off signal, thus the first transistor T1 is turned off.

In the reset sub-phase t1, a turning-on reset control signal is provided through the respective first reset control signal line rst1 to the gate electrode of the first reset transistor Tr1 to turn on the first reset transistor Tr1; allowing an initialization voltage signal from the respective first reset signal line Vint1 to pass from a first electrode of the first reset transistor Tr1 to a second electrode of the first reset transistor Tr1; and in turn to the node N4. The anode of the light emitting element LE is initialized. A turning-on reset control signal is provided through the respective first reset control signal line rst1 to the gate electrode of the third reset transistor Tr3 to turn on the third reset transistor Tr3; allowing an initialization voltage signal from the respective third reset signal line Vint3 to pass from a first electrode of the third reset transistor Tr3 to a second electrode of the third reset transistor Tr3; and in turn to the node N2. The node N2 is initialized. In the reset sub-phase t1, the respective first gate line GL1 is provided with a turning-off signal, thus the first transistor T1 is turned off. The respective light emitting control signal line em is provided with a high voltage signal to turn off the third transistor T3 and the fourth transistor T4.

In the data write sub-phase 12, a turning-on reset control signal is provided through the second reset control signal line rst2 to the gate electrode of the second reset transistor Tr2 to turn on the second reset transistor Tr2; allowing an initialization voltage signal from the respective second reset signal line Vint2 to pass from a first electrode of the second reset transistor Tr2 to a second electrode of the second reset transistor Tr2, and in turn to the first capacitor electrode Ce1 and the gate electrode of the driving transistor Td. The gate electrode of the driving transistor Td is initialized. The second capacitor electrode Ce2 receives a high voltage signal from the respective voltage supply line Vdd. The first capacitor electrode Ce1 is charged in the data write sub-phase t2 due to an increasing voltage difference between the first capacitor electrode Ce1 and the second capacitor electrode Ce2.

In the data write sub-phase 12, the turning-off reset control signal is again provided through the respective first reset control signal line rst1 to the gate electrode of the first reset transistor Tr1 and the gate electrode of the third reset transistor Tr3 to turn off the first reset transistor Tr1 and the third reset transistor Tr3. The respective first gate line GL1 and the respective second gate line GL2 are provided with a turning-on signal, thus the first transistor T1 and the second transistor T2 are turned on. A second electrode of the driving transistor Td is connected with the second electrode of the second transistor T2. A gate electrode of the driving transistor Td is electrically connected with the first electrode of the second transistor T2. Because the second transistor T2 is turned on in the data write sub-phase 12, the gate electrode and the second electrode of the driving transistor Td are connected and short circuited, and only the PN junction between the gate electrode and a first electrode of the driving transistor Td is effective, thus rendering the driving transistor Td in a diode connecting mode. The first transistor T1 is turned on in the data write sub-phase 12. The data voltage signal transmitted through the respective data line DL is received by a first electrode of the first transistor T1, and in turn transmitted to the first electrode of the driving transistor Td, which is connected to the second electrode of the first transistor T1. A node N2 connecting to the first electrode of the driving transistor Td has a voltage level of the data voltage signal. Because only the PN junction between the gate electrode and a first electrode of the driving transistor Td is effective, the voltage level at the node N1 in the data write sub-phase 12 increase gradually to (Vdata+Vth), wherein the Vdata is the voltage level of the data voltage signal, and the Vth is the voltage level of the threshold voltage Th of the PN junction. The storage capacitor Cst is discharged because the voltage difference between the first capacitor electrode Ce1 and the second capacitor electrode Ce2 is reduced to a relatively small value. The respective light emitting control signal line em is provided with a high voltage signal to turn off the third transistor T3 and the fourth transistor T4.

In the light emitting sub-phase 13, a turning-off reset control signal is provided through the respective second reset control signal line rst2 to the gate electrode of the second reset transistor Tr2 to turn off the second reset transistor Tr2, A turning-off reset control signal is provided through the respective first reset control signal line rst1 to the gate electrode of the first reset transistor Tr1 and the gate electrode of the third reset transistor Tr3 to turn off the first reset transistor Tr1 and the third reset transistor Tr3. The respective first gate line GL1 and the respective second gate line GL2 are provided with a turning-off signal, the first transistor T1 and the second transistor T2 are turned off. The respective light emitting control signal line em is provided with a low voltage signal to turn on the third transistor T3 and the fourth transistor T4. The voltage level at the node N1 in the light emitting sub-phase t3 is maintained at (Vdata+Vth), the driving transistor Td is turned on by the voltage level, and working in the saturation area. A path is formed through the third transistor T3, the driving transistor Td, the fourth transistor T4, to the light emitting element LE, The driving transistor Td generates a driving current for driving the light emitting element LE to emit light. A voltage level at a node N3 connected to the second electrode of the driving transistor Td equals to a light emitting voltage of the light emitting element LE.

Figure 9:
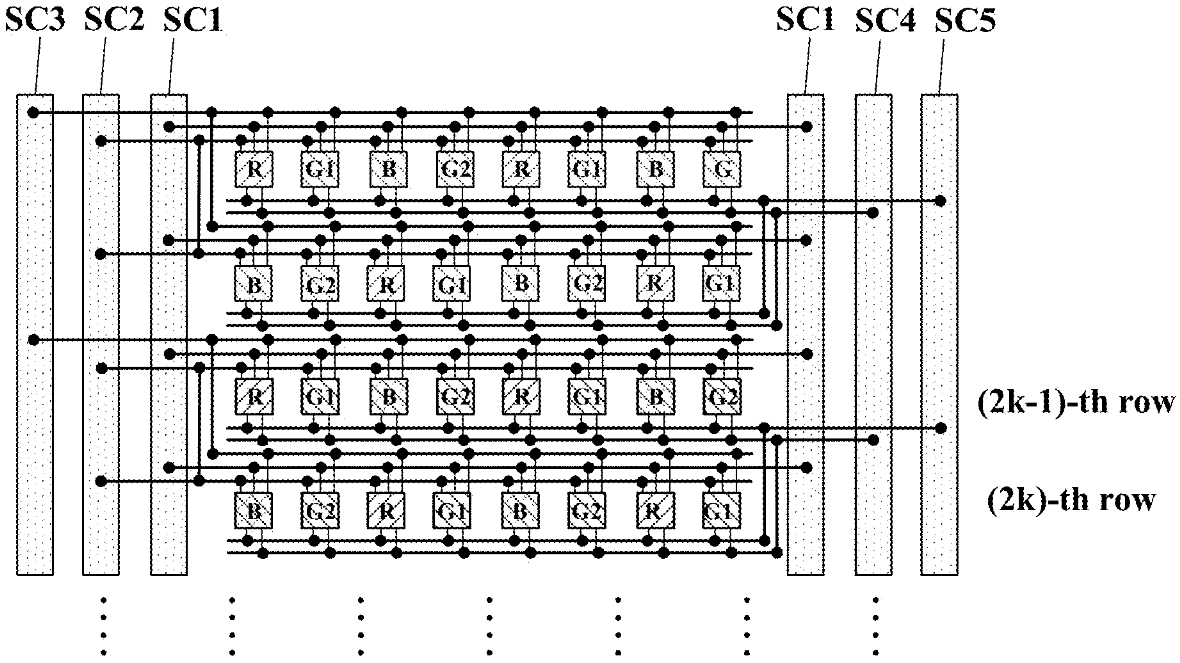
FIG. 9 is a diagram illustrating one or more scan circuits in a display apparatus in some embodiments according to the present disclosure.

FIG. 9 is a diagram illustrating one or more scan circuits in a display apparatus in some embodiments according to the present disclosure. Referring to FIG. 9, the display apparatus in some embodiments includes a plurality of rows of subpixels and one or more scan circuits configured to provide control signals to the plurality of rows of subpixels. As shown in FIG. 9, the display apparatus in some embodiments includes a first scan circuit SC1 and a second scan circuit SC2.

In some embodiments, the first scan circuit SC1 includes a plurality of stages of cascaded scan units. Optionally, the plurality of stages of cascaded scan units of the first scan circuit SC1 are configured to provide a plurality of control signals (e.g., gate scanning signals, reset control signals, or light emission control signals) to a plurality of rows of subpixels. Optionally, as shown in FIG. 9, a respective stage of cascaded scan unit of the plurality of stages of cascaded scan units of the first scan circuit SC1 is configured to provide control signals to a single row of subpixels. In some embodiments, the first scan circuit SC1 is a first gate scanning signal generating circuit configured to generate gate scanning signals for subpixels in the array substrate. In one example, the first scan circuit SC1 is a first gate scanning signal generating circuit configured to generate gate scanning signals for the plurality of first gate lines (a respective first gate line GL1 is denoted in FIG. 8A). The plurality of first gate lines are configured to provide gate scanning signals to the first transistor T1 (e.g., a p-type transistor) in the respective pixel driving circuit.

In some embodiments, the first scan circuits SC1 includes scan units on both sides of the display panel. A respective stage of the first scan circuit SC1 includes scan units on both sides of the display panel, and the scan units of a same stage on both sides of the display panel are configured to provide control signals to a same row of subpixels.

In some embodiments, the second scan circuit SC2 includes a plurality of stages of cascaded scan units. Optionally, the plurality of stages of cascaded scan units of the second scan circuit SC2 are configured to provide a plurality of control signals (e.g., gate scanning signals, reset control signals, or light emission control signals) to a plurality of rows of subpixels. Optionally, as shown in FIG. 9, a respective stage of cascaded scan unit of the plurality of stages of cascaded scan units of the second scan circuit SC2 is configured to provide control signals to multiple rows (e.g., two rows) of subpixels. In some embodiments, the second scan circuit SC2 is a second gate scanning signal generating circuit configured to generate gate scanning signals for subpixels in the array substrate. In one example, the second scan circuit SC2 is a second gate scanning signal generating circuit configured to generate gate scanning signals for the plurality of second gate lines (a respective second gate line GL2 is denoted in FIG. BA). The plurality of second gate lines are configured to provide gate scanning signals to the second transistor T2 (e.g., an n-type transistor) in the respective pixel driving circuit.

In some embodiments, the display apparatus further includes a third scan circuit SC3, a fourth scan circuit SC4, and a fifth scan circuit SC5. In some embodiments, the third scan circuit SC3 includes a plurality of stages of cascaded scan units. Optionally, the plurality of stages of cascaded scan units of the third scan circuit SC3 are configured to provide a plurality of control signals (e.g., gate scanning signals, reset control signals, or light emission control signals) to a plurality of rows of subpixels. Optionally, as shown in FIG. 9, a respective stage of cascaded scan unit of the plurality of stages of cascaded scan units of the third scan circuit SC3 is configured to provide control signals to multiple rows (e.g., two rows) of subpixels. In some embodiments, the third scan circuit SC3 is a second reset control signal generating circuit configured to generate reset control signals for subpixels in the array substrate. In one example, the third scan circuit SC3 is a second reset control signal generating circuit configured to generate second reset control signals for the plurality of second reset control signal lines (a respective second reset control signal line rst2 is denoted in FIG. 8A). The plurality of second reset control signal lines are configured to provide second reset control signals to the second reset transistor Tr2 (e.g., a p-type transistor) in the respective pixel driving circuit.

In some embodiments, the fourth scan circuit SC4 includes a plurality of stages of cascaded scan units. Optionally, the plurality of stages of cascaded scan units of the fourth scan circuit SC4 are configured to provide a plurality of control signals (e.g., gate scanning signals, reset control signals, or light emission control signals) to a plurality of rows of subpixels. Optionally, as shown in FIG. 9, a respective stage of cascaded scan unit of the plurality of stages of cascaded scan units of the fourth scan circuit SC4 is configured to provide control signals to multiple rows (e.g., two rows) of subpixels. In some embodiments, the fourth scan circuit SC4 is a first reset control signal generating circuit configured to generate reset control signals for subpixels in the array substrate. In one example, the fourth scan circuit SC4 is a first reset control signal generating circuit configured to generate first reset control signals for the plurality of first reset control signal lines (a respective first reset control signal line rst1 is denoted in FIG. 8A). The plurality of first reset control signal lines are configured to provide first reset control signals to the first reset transistor Tr1 and the third reset transistor Tr3 (e.g., p-type transistors) in the respective pixel driving circuit.

In some embodiments, the fifth scan circuit SC5 includes a plurality of stages of cascaded scan units. Optionally, the plurality of stages of cascaded scan units of the fifth scan circuit SC5 are configured to provide a plurality of control signals (e.g., gate scanning signals, reset control signals, or light emission control signals) to a plurality of rows of subpixels. Optionally, as shown in FIG. 9, a respective stage of cascaded scan unit of the plurality of stages of cascaded scan units of the fifth scan circuit SC5 is configured to provide control signals to multiple rows (e.g., two rows) of subpixels. In some embodiments, the fifth scan circuit SC5 is a light emitting control signal generating circuit configured to generate light emitting control signals for subpixels in the array substrate. In one example, the fifth scan circuit SC5 is a light emitting control signal generating circuit configured to generate light emitting control signals for the plurality of light emitting control signal lines (a respective light emitting control signal line em is denoted in FIG. 8A). The plurality of light emitting control signal lines are configured to provide light emitting control signals to the third transistor T3 and the fourth transistor T4 (e.g., p-type transistors) in the respective pixel driving circuit.

Figure 10:
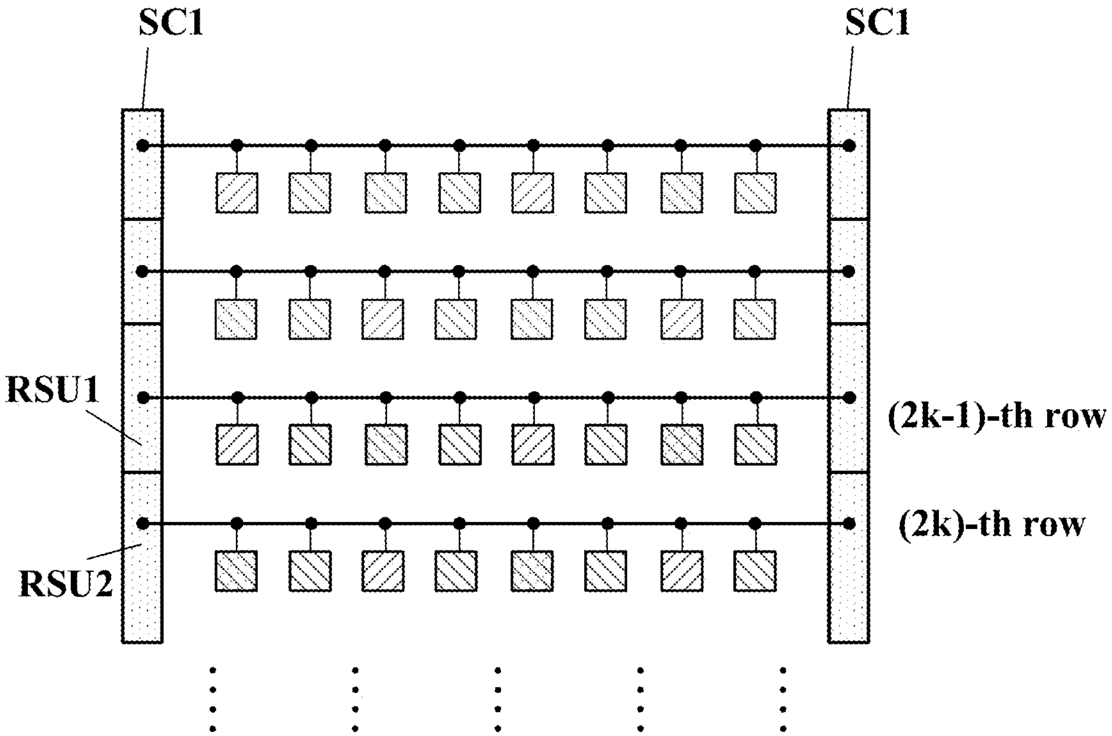
FIG. 10 is a diagram illustrating a first scan circuit in a display apparatus in some embodiments according to the present disclosure.

FIG. 10 is a diagram illustrating a first scan circuit in a display apparatus in some embodiments according to the present disclosure. Referring to FIG. 10, the first scan circuit in some embodiments includes a plurality of first scan units and a plurality of second scan units. Optionally, the plurality of first scan units and the plurality of second scan units are alternately arranged. Optionally, a respective first scan unit RSU1 and a respective second scan unit RSU2 are configured to provide control signals to two adjacent rows of subpixels, respectively. In one example, the respective first scan unit RSU1 and the respective second scan unit RSU2 are configured to provide first gate scanning signals to data write transistors in pixel driving circuits in the two adjacent rows of subpixels, respectively.

In some embodiments, control signals output from the respective first scan unit RSU1 and provided to a first adjacent row of subpixels are out of phase with respect to control signals output from the respective second scan unit RSU2 and provided to a second adjacent row of subpixels. In one example, first gate scanning signals output from the respective first scan unit RSU1 and provided to the first adjacent row of subpixels are out of phase with respect to first gate scanning signals output from the respective second scan unit RSU2 and provided to the second adjacent row of subpixels.

Figure 11:
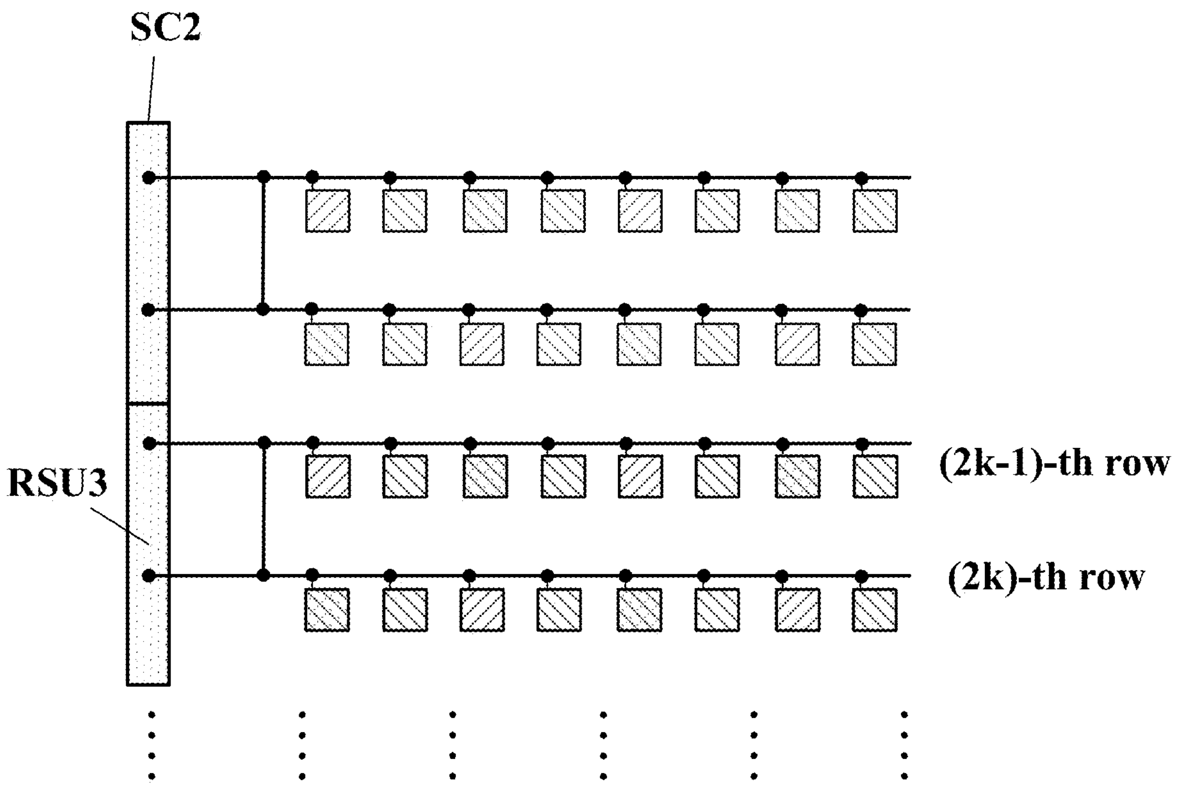
FIG. 11 is a diagram illustrating a second scan circuit in a display apparatus in some embodiments according to the present disclosure.

FIG. 11 is a diagram illustrating a second scan circuit in a display apparatus in some embodiments according to the present disclosure. Referring to FIG. 11, the second scan circuit SC2 in some embodiments includes a plurality of third scan units. Optionally, a respective third scan unit RSU3 of the plurality of third scan units is configured to provide control signals to two adjacent rows of subpixels. In one example, the respective third scan unit RSU3 of the plurality of third scan units is configured to provide second gate scanning signals to compensating transistors in pixel driving circuits in the two adjacent rows of subpixels.

In some embodiments, control signals output from the respective third scan unit RSU3 and provided to a first adjacent row of subpixels are in-phase with respect to control signals output from the respective third scan unit RSU3 and provided to a second adjacent row of subpixels. In one example, second gate scanning signals output from the respective third scan unit RSU3 and provided to the first adjacent row of subpixels are in-phase with respect to second gate scanning signals output from the respective third scan unit RSU3 and provided to the second adjacent row of subpixels.

A compensating transistor (e.g., the second transistor T2 depicted in FIG. 8A) is configured to compensate a threshold voltage of a driving transistor in a respective pixel driving circuit. A compensating duration is a duration starting from a time point when the data write transistor in the respective pixel driving circuit is turned on to a time point when the compensating transistor transits from a turning-on state to a turning-off state.

In some embodiments, compensating transistors in the pixel driving circuits in the two adjacent rows of subpixels are configured to receive second gate scanning signals from a same third scan unit (e.g., the respective third scan unit RSU3). In one example, second gate scanning signals provided to the compensating transistors in the pixel driving circuits in the two adjacent rows of subpixels and in a same column of subpixels are in-phase with respect to each other. Accordingly, the two compensating transistors in the pixel driving circuits in the two adjacent rows of subpixels and in the same column of subpixels are turned on or turned off at a substantially the same time point.

In some embodiments, data write transistors in the pixel driving circuits in the two adjacent rows of subpixels are configured to receive first gate scanning signals from two different scan units (e.g., the respective first scan unit RSU1 and the respective second scan unit RSU2). In one example, first gate scanning signals provided to the data write transistors in the pixel driving circuits in the two adjacent rows of subpixels and in a same column of subpixels are out of phase with respect to each other. Accordingly, the two data write transistors in the pixel driving circuits in the two adjacent rows of subpixels and in the same column of subpixels are turned on at different time points.

Because the two data write transistors in the pixel driving circuits in the two adjacent rows of subpixels and in the same column of subpixels are turned on at different time points, and the two compensating transistors in the pixel driving circuits in the two adjacent rows of subpixels and in a same column of subpixels are turned on or turned off at a substantially the same time point, compensating durations for compensating threshold voltages of driving transistors in the pixel driving circuits in the two adjacent rows of subpixels and in the same column of subpixels are different from each other.

In some embodiments, the display apparatus includes K number of rows of subpixels, K being an integer greater than 1. The K number of rows of subpixels includes a (2k−1)-th row of subpixels and a (2k)-th row of subpixels, $1 \leq k \leq (K/2)$, k being an integer. Referring to FIG. 10 and FIG. 11, the first scan circuit in some embodiments includes a plurality of first scan units and a plurality of second scan units. Optionally, the plurality of first scan units and the plurality of second scan units are alternately arranged. Optionally, a respective first scan unit RSU1 is configured to provide control signals to a (2k−1)-th row of subpixels, and a respective second scan unit RSU2 is configured to provide control signals to a (2k)-th row of subpixels. In one example, the respective first scan unit RSU1 is configured to provide first gate scanning signals to data write transistors in pixel driving circuits in the (2k−1)-th row of subpixels, and the respective second scan unit RSU2 is configured to provide first gate scanning signals to data write transistors in pixel driving circuits in the (2k)-th row of subpixels.

In some embodiments, control signals output from the respective first scan unit RSU1 and provided to the (2k−1)-th row of subpixels are out of phase with respect to control signals output from the respective second scan unit RSU2 and provided to the (2k)-th row of subpixels. In one example, first gate scanning signals output from the respective first scan unit RSU1 and provided to the (2k−1)-th row of subpixels are out of phase with respect to first gate scanning signals output from the respective second scan unit RSU2 and provided to the (2k)-th row of subpixels.

In some embodiments, the second scan circuit SC2 includes a plurality of third scan units. Optionally, a respective third scan unit RSU3 of the plurality of third scan units is configured to provide control signals to the (2k−1)-th row of subpixels and the (2k)-th row of subpixels. In one example, the respective third scan unit RSU3 of the plurality of third scan units is configured to provide second gate scanning signals to compensating transistors in pixel driving circuits in the (2k−1)-th row of subpixels and the (2k)-th row of subpixels.

In some embodiments, control signals output from the respective third scan unit RSU3 and provided to the (2k−1)-th row of subpixels are in-phase with respect to control signals output from the respective third scan unit RSU3 and provided to the (2k)-th row of subpixels. In one example, second gate scanning signals output from the respective third scan unit RSU3 and provided to the (2k−1)-th row of subpixels are in-phase with respect to second gate scanning signals output from the respective third scan unit RSU3 and provided to the (2k)-th row of subpixels.

In some embodiments, compensating transistors in the pixel driving circuits in the (2k−1)-th row of subpixels and the (2k)-th row of subpixels are configured to receive second gate scanning signals from a same third scan unit (e.g., the respective third scan unit RSU3). In one example, second gate scanning signals provided to the compensating transistors in the pixel driving circuits in the (2k−1)-th row of subpixels and the (2k)-th row of subpixels and in a same column of subpixels are in-phase with respect to each other. Accordingly, the two compensating transistors in the pixel driving circuits in the (2k−1)-th row of subpixels and the (2k)-th row of subpixels and in the same column of subpixels are turned on or turned off at a substantially the same time point.

In some embodiments, data write transistors in the pixel driving circuits in the (2k−1)-th row of subpixels and the (2k)-th row of subpixels are configured to receive first gate scanning signals from two different scan units (e.g., the respective first scan unit RSU1 and the respective second scan unit RSU2). In one example, first gate scanning signals provided to the data write transistors in the pixel driving circuits in the (2k−1)-th row of subpixels and the (2k)-th row of subpixels and in a same column of subpixels are out of phase with respect to each other. Accordingly, the two data write transistors in the pixel driving circuits in the (2k−1)-th row of subpixels and the (2k)-th row of subpixels and in the same column of subpixels are turned on at different time points.

Because the two data write transistors in the pixel driving circuits in the (2k−1)-th row of subpixels and the (2k)-th row of subpixels and in the same column of subpixels are turned on at different time points, and the two compensating transistors in the pixel driving circuits in the (2k−1)-th row of subpixels and the (2k)-th row of subpixels and in the same column of subpixels are turned on or turned off at a substantially the substantially the same time point, compensating durations for compensating threshold voltages of driving transistors in the pixel driving circuits in the (2k−1)-th row of subpixels and the (2k)-th row of subpixels and in the same column of subpixels are different from each other.

Figure 12:
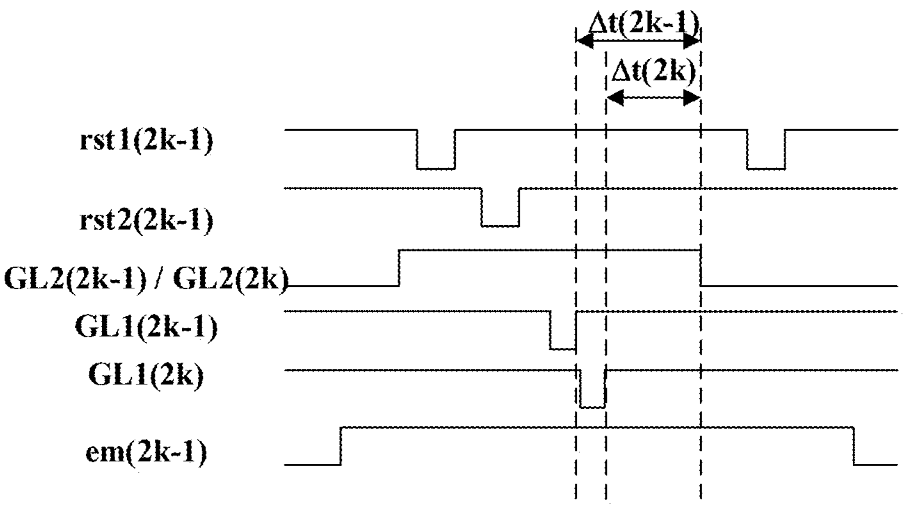
FIG. 12 is a timing diagram illustrating an operation of scan circuits illustrated in FIG. 10.

FIG. 12 is a timing diagram illustrating an operation of scan circuits illustrated in FIG. 10. Referring to FIG. 12, a first compensation duration for compensating threshold voltages of driving transistors in the pixel driving circuits in the (2k−1)-th row of subpixels and in the same column of subpixels is denoted as Δt(2k−1), and a second compensation duration for compensating threshold voltages of driving transistors in the pixel driving circuits in the (2k)-th row of subpixels and in the same column of subpixels is denoted as Δt(2k). In FIG. 12, the timing diagram for first gate scanning signals provided to the (2k−1)-th row of subpixels is denoted as GL1 (2k−1), the timing diagram for first gate scanning signals provided to the (2k)-th row of subpixels is denoted as GL1 (2k), the timing diagram for second gate scanning signals provided to the (2k−1)-th row of subpixels and the (2k)-th row of subpixels is denoted as GL2 (2k−1)/GL2 (2k), the timing diagram for first reset control signals provided to the (2k−1)-th row of subpixels is denoted as rst1 (2k−1), the timing diagram for second reset control signals provided to the (2k−1)-th row of subpixels is denoted as rst2 (2k−1), and the timing diagram for light emitting control signals provided to the (2k−1)-th row of subpixels is denoted as em (2k−1).

As used herein, the term "(2k−1)-th row" and the term "(2k)-th row" are used in the context of the K rows. The array substrate may or may not include additional row(s) before the first row of the K rows and/or additional rows after the last row of the K number of rows. In the context of the array substrate, the term "(2k−1)-th row" does not necessarily denote an odd-numbered row, and the term "(2k)-th row does not necessarily denote an even-numbered row. In one example, the (2k−1)-th row is an odd-numbered row in the context of the K number of rows, but may be an even-numbered row in the context of the array substrate. In another example, the (2k−1)-th row is an odd-numbered row in the context of the K number of rows, and also an odd-numbered row in the context of the array substrate. In one example, the (2k)-th row is an even-numbered row in the context of the K rows, but may be an odd-numbered row in the context of the array substrate. In another example, the (2k)-th row is an even-numbered row in the context of the K rows, and also an even-numbered row in the context of the array substrate.

The inventors of the present disclosure discover that, because the first compensation duration Δt(2k−1) is different from the second compensation duration Δt(2k), a first voltage level at gate electrodes of driving transistors in the pixel driving circuits in the (2k−1)-th row of subpixels and in the same column of subpixels is different from a second voltage level at gate electrodes of driving transistors in the pixel driving circuits in the (2k)-th row of subpixels and in the same column of subpixels, at the end of the first compensation duration and the second compensation duration. Because the first voltage level is different from the second voltage level, a first luminance value of a first subpixel in the (2k−1)-th row of subpixels and in the same column of subpixels is different from a second luminance value of a second subpixel in the (2k)-th row of subpixels and in the same column of subpixels, when data signals of a same voltage are applied to the first subpixel and the second subpixel, respectively.

In some embodiments, the first compensation duration Δt(2k−1) is greater than the second compensation duration Δt(2k), and the first luminance value is greater than the second luminance value. The inventors of the present disclosure discover that the difference between the first luminance value and the second luminance value adversely affects display quality.

Referring to FIG. 9, a pixel in the display apparatus includes a red subpixel R, a blue subpixel B, a first green subpixel G1, and a second green subpixel G2. As shown in FIG. 9, each row of subpixels includes red subpixels, blue subpixels, first green subpixels, and second green subpixels. For example, the (2k−1)-th row of subpixels includes red subpixels, blue subpixels, first green subpixels, and second green subpixels, and the (2k)-th row of subpixels includes red subpixels, blue subpixels, first green subpixels, and second green subpixels. Because the first compensation duration Δt(2k−1) for compensating threshold voltages of driving transistors in the pixel driving circuits in the (2k−1)-th row of subpixels and in the same column of subpixels is different from the second compensation duration Δt(2k) for compensating threshold voltages of driving transistors in the pixel driving circuits in the (2k)-th row of subpixels and in the same column of subpixels, subpixels of a same color in the (2k−1)-th row of subpixels and in the (2k)-th row of subpixels have different luminance values when data signals of a same voltage are applied to the subpixels of the same color, respectively. The difference in luminance values adversely affects display quality.

Figure 13:
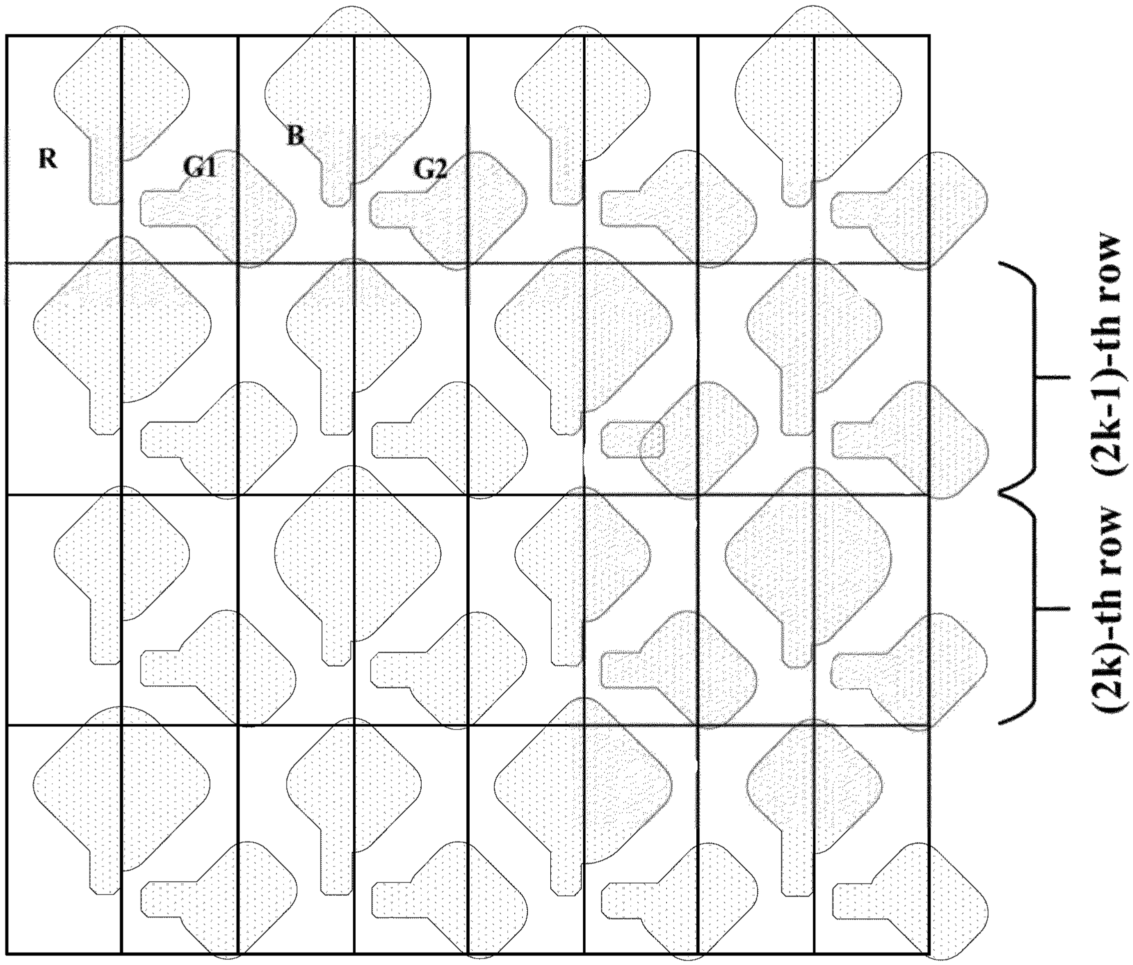
FIG. 13 is a diagram illustrating a layout of subpixels in a display apparatus in some embodiments according to the present disclosure.

FIG. 13 is a diagram illustrating a layout of subpixels in a display apparatus in some embodiments according to the present disclosure. Referring to FIG. 13, a pixel in the display apparatus includes a red subpixel R, a blue subpixel B, a first green subpixel (1, and a second green subpixel G2. Anodes associated to the red subpixel R, the blue subpixel B, the first green subpixel C1, and the second green subpixel G2 are shown in FIG. 13. As shown in FIG. 13, each row of subpixels includes red subpixels, blue subpixels, first green subpixels, and second green subpixels. For example, the (2k−1)-th row of subpixels includes red subpixels, blue subpixels, first green subpixels, and second green subpixels, and the (2k)-th row of subpixels includes red subpixels, blue subpixels, first green subpixels, and second green subpixels. First green subpixels and second green subpixels in a same row are close to each other, forming a line of green subpixels. Thus, the differences between luminance values of a line of green subpixels in the (2k−1)-th row and a line of green subpixels in the (2k)-th row becomes particularly prominent, adversely affecting display quality.

Figure 14:
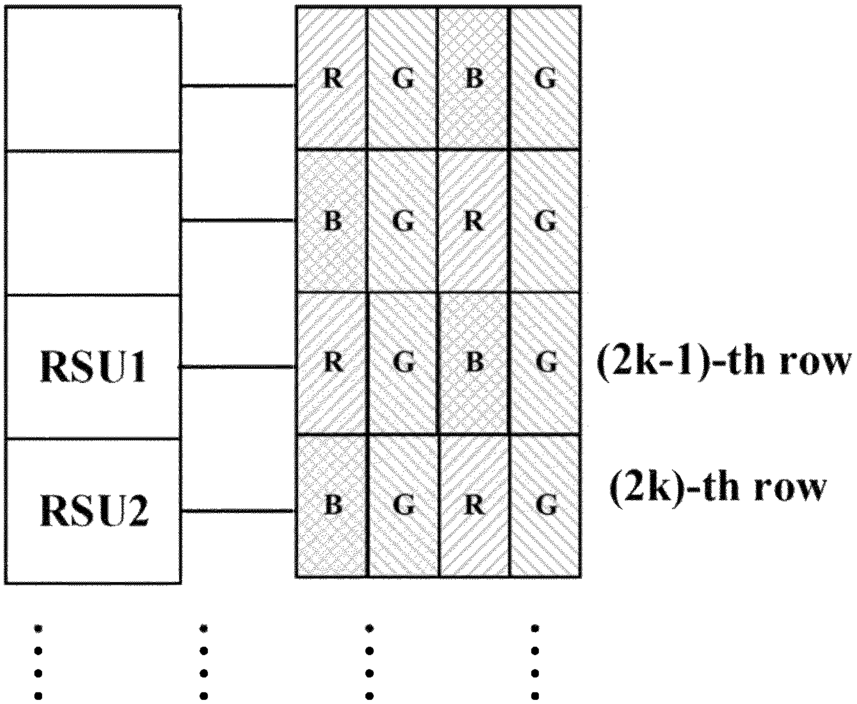
FIG. 14 is a diagram illustrating a layout of subpixels in a display apparatus in some embodiments according to the present disclosure.

FIG. 14 is a diagram illustrating a layout of subpixels in a display apparatus in some embodiments according to the present disclosure. Referring to FIG. 14, a pixel in the display apparatus includes a red subpixel R, a blue subpixel B, a first green subpixel G1, and a second green subpixel G2. As shown in FIG. 14, each row of subpixels includes red subpixels, blue subpixels, first green subpixels, and second green subpixels. For example, the (2k−1)-th row of subpixels includes red subpixels, blue subpixels, first green subpixels, and second green subpixels, and the (2k)-th row of subpixels includes red subpixels, blue subpixels, first green subpixels, and second green subpixels. A respective first scan unit RSU1 is configured to provide first gate scanning signals to the (2k−1)-th row of subpixels. A respective second scan unit RSU2 is configured to provide first gate scanning signals to the (2k)-th row of subpixels.

In some embodiments, a first control signal output from the respective first scan unit. RSU1 and provided to the (2k−1)-th row of subpixels is a second clock signal; and a second control signal output from the respective second scan unit RSU2 and provided to the (2k)-th row of subpixels is a first clock signal. In one example, the respective first scan unit RSU1 is a scan unit depicted in FIG. 1, and the second clock signal is the second clock signal CB. In another example, the respective second scan unit RSU2 is a scan unit depicted in FIG. 3, and the first clock signal is the first clock signal CK.

In some embodiments, the first clock signal CK and the second clock signal CB are out of phase with respect to each other, as shown in FIG. 2 or FIG. 4.

In some embodiments, as shown in FIG. 1 to FIG. 6, output of a first control signal from the respective first scan unit RSU1 is controlled by the second clock signal CB; and output of a second control signal from the respective second scan unit RSU2 is controlled by the first clock signal CK. In one example, the first control signal is a first gate scanning signal, and the second control signal is a second gate scanning signal.

In some embodiments, a first duration of an effective voltage of the first control signal output from the respective first scan unit RSU1 is controlled by the second clock signal CB; and a second duration of an effective voltage of the second control signal output from the respective second scan unit RSU2 is controlled by the first clock signal CK. In one example, the first control signal is a first gate scanning signal, and the second control signal is a second gate scanning signal.

In some embodiments, the first duration of the effective voltage of the first control signal output from the respective first scan unit RSU1 is substantially the same as a duration of an effective voltage of the second clock signal CB; and the second duration of the effective voltage of the second control signal output from the respective second scan unit RSU2 is substantially the same as a duration of an effective voltage of the first clock signal CK.

The inventors of the present disclosure discover that, the longer a duration of an effective voltage of a control signal output from a scan unit, the higher a voltage level of a voltage applied to a gate electrode of a driving transistor in a pixel driving circuit connected to the scan unit. The higher the voltage level of the voltage applied to the gate electrode of the driving transistor in the pixel driving circuit connected to the scan unit, the smaller a driving current generated in the pixel driving circuit. The smaller the driving current generated in the pixel driving circuit, the smaller a luminance value in a subpixel having the pixel driving circuit.

As discussed above, the first compensation duration $\Delta t(2k-1)$ for compensating threshold voltages of driving transistors in the pixel driving circuits in the (2k−1)-th row of subpixels and in the same column of subpixels is greater than the second compensation duration $\Delta t(2k)$ for compensating threshold voltages of driving transistors in the pixel driving circuits in the (2k)-th row of subpixels and in the same column of subpixels. The first luminance value of a first subpixel in the (2k−1)-th row of subpixels and in the same column of subpixels is greater than the second luminance value of a second subpixel in the (2k)-th row of subpixels and in the same column of subpixels, when data signals of a same voltage are applied to the first subpixel and the second subpixel, respectively. The inventors of the present disclosure discover that, surprisingly and unexpectedly, the difference between the first luminance value and the second luminance value can be compensated by having the first duration of the effective voltage of the first control signal output from the respective first scan unit RSU1 greater than the second duration of the effective voltage of the second control signal output from the respective second scan unit RSU2.

Figure 15:
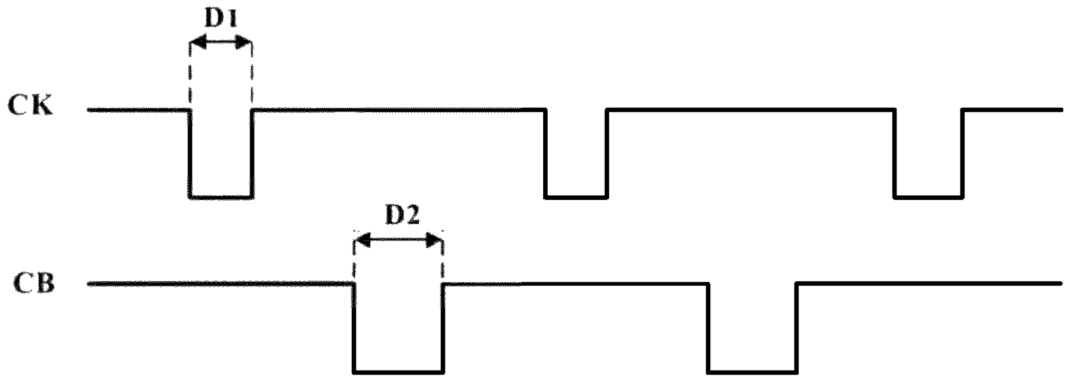
FIG. 15 illustrates a duration of an effective voltage of a first clock signal and a duration of an effective voltage of a second clock signal.

The inventors of the present disclosure further discover that having the first duration of the effective voltage of the first control signal output from the respective first scan unit RSU1 greater than the second duration of the effective voltage of the second control signal output from the respective second scan unit RSU2 can be achieved by having a duration of an effective voltage of the second clock signal CB greater than a duration of an effective voltage of the first clock signal CK. FIG. 15 illustrates a duration of an effective voltage of a first clock signal and a duration of an effective voltage of a second clock signal. As shown in FIG. 15, in some embodiments, the first clock signal CK has a first duration D1, and the second clock signal CB has a second duration D2. Optionally, the second duration D2 is greater than the first duration D1.

The inventors of the present disclosure further discover that having the duration of an effective voltage of the second clock signal CB greater than the duration of an effective voltage of the first clock signal CK can be achieved by having a resistance-capacitance loading ("RC loading") of the second clock signal CB smaller than a resistance-capacitance loading of the first clock signal CK. Accordingly, by having the resistance-capacitance loading of the second clock signal CB smaller than the resistance-capacitance loading of the first clock signal CK the difference between the first luminance value and the second luminance value can be compensated; and a first compensated luminance value of the first subpixel in the (2k−1)-th row of subpixels and in the same column of subpixels is substantially the same as a second compensated luminance value of a second subpixel in the (2k)-th row of subpixels and in the same column of subpixels, when data signals of a same voltage are applied to the first subpixel and the second subpixel, respectively. As used herein, the term "resistance-capacitance loading" refers to an effect of one or a combination of resistance and capacitance to the behavior of a signal (e.g., a clock signal). For example, a resistor limits the current flow, while the capacitor stores and releases electrical charges over time. A clock signal is used to synchronize the operation of different components of a circuit (e.g., the scan unit of a scan circuit). The resistance-capacitance loading (e.g., one or a combination of resistance and capacitance) can affect the behavior of the clock signal. For example, the resistance-capacitance loading may cause the rising time of the clock signal to slow down, resulting in a shorter duration of an effective voltage of the pulse of the clock signal. In another example, the resistance-capacitance loading (in particular the capacitance loading) may cause the pulse to be delayed as the capacitor takes time to charge or discharge, similarly resulting in a shorter duration of an effective voltage of the pulse of the clock signal. Various appropriate methods may be used for calculating resistance-capacitance loading. In one specific example, the resistance-capacitance loading is calculated using the formula Rx C, where R is the resistance value in ohms and C is the capacitance value in farads.

Figure 16A:
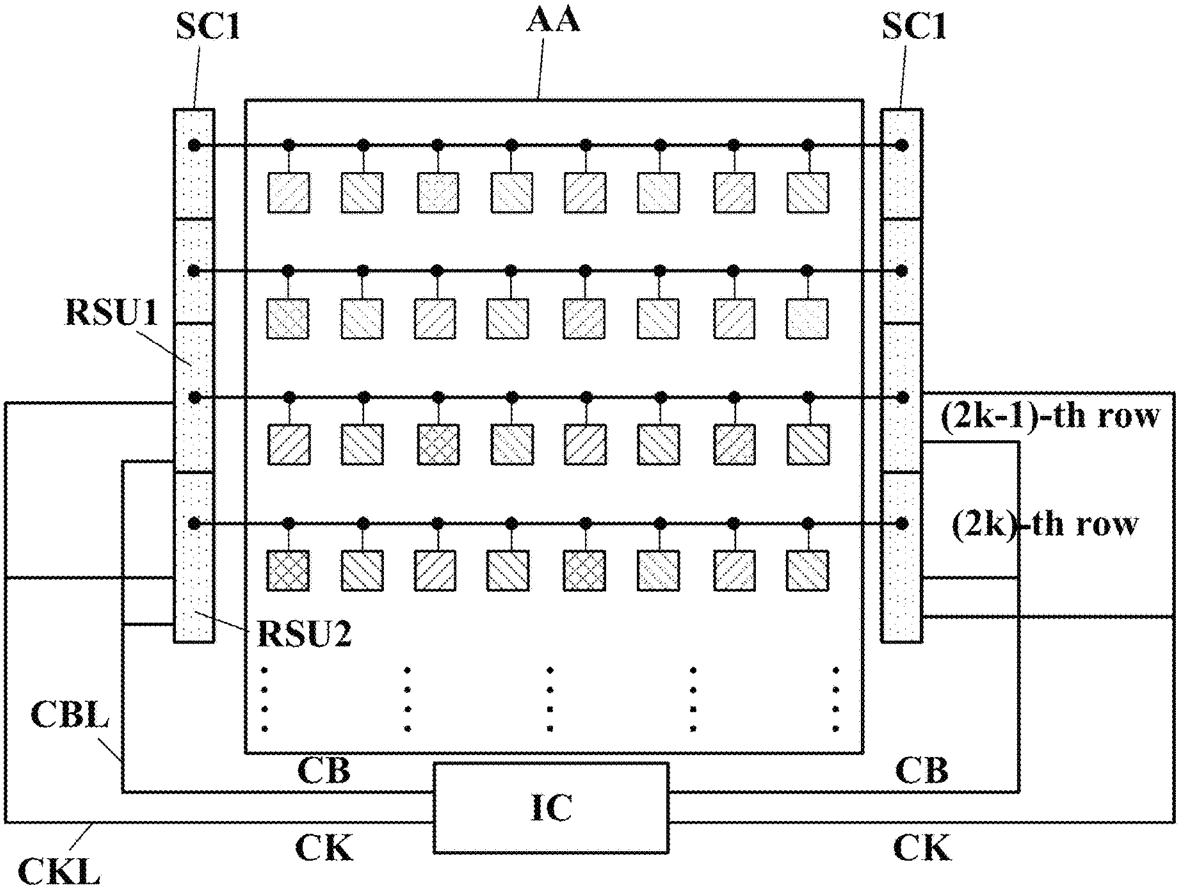
FIG. 16A is a diagram illustrating the structure of a display apparatus in some embodiments according to the present disclosure.

FIG. 16A is a diagram illustrating the structure of a display apparatus in some embodiments according to the present disclosure. Referring to FIG. 16A, the display apparatus in some embodiments includes a display area AA comprising a plurality rows of subpixels; a first scan circuit SC1 comprising a respective first scan unit RSU1 and a respective second scan unit RSU2 configured to provide control signals to two adjacent rows of subpixels, respectively; and an integrated circuit IC configured to provide the first clock signal CK and the second clock signal CB to the first scan circuit SC1.

In some embodiments, the display apparatus further includes a first clock signal line CKL connecting the integrated circuit IC with a scan unit (e.g., the respective first scan unit RSU1 or the respective second scan unit RSU2) and configured to provide the first clock signal CK to the scan unit, and a second clock signal line CBL connecting the integrated circuit IC with the scan unit and configured to provide the second clock signal CB to the scan unit.

In some embodiments, a resistance-capacitance loading of the first clock signal line CKL is greater than a resistance-capacitance loading of the second clock signal line CBL by at least 0.1%, e.g., by at least 0.2%, by at least 0.3%, by at least 0.4%, by at least 0.5%, by at least. 0.6%, by at least 0.7%, by at least 0.8%, by at least 0.9%, by at least 1.0%, by at least 1.5%, by at least 2.0%, by at least 2.5%, by at least 3.0%, by at least 3.5%, by at least 4.0%, by at least 4.5%, by at least 5.0%, by at least 5.5%, by at least 6.0%, by at least 6.5%, by at least 7.0%, by at least 7.5%, by at least 8.0%, by at least 8.5%, by at least 9.0%, by at least 9.5%, or by at least 10.0%.

In some embodiments, a resistance-capacitance loading of the first clock signal line CKL is greater than a resistance-capacitance loading of the second clock signal line CBL by no more than 20%, e.g., no more than 19%, no more than 18%, no more than 17%, no more than 16%, no more than 15%, no more than 14%, no more than 13%, no more than 12%, no more than 11%, no more than 10%, no more than 9%, no more than 8%, no more than 7%, no more than 6%, no more than 5%, no more than 4%, no more than 3%, no more than 2%, or no more than 1%.

Figure 16B:
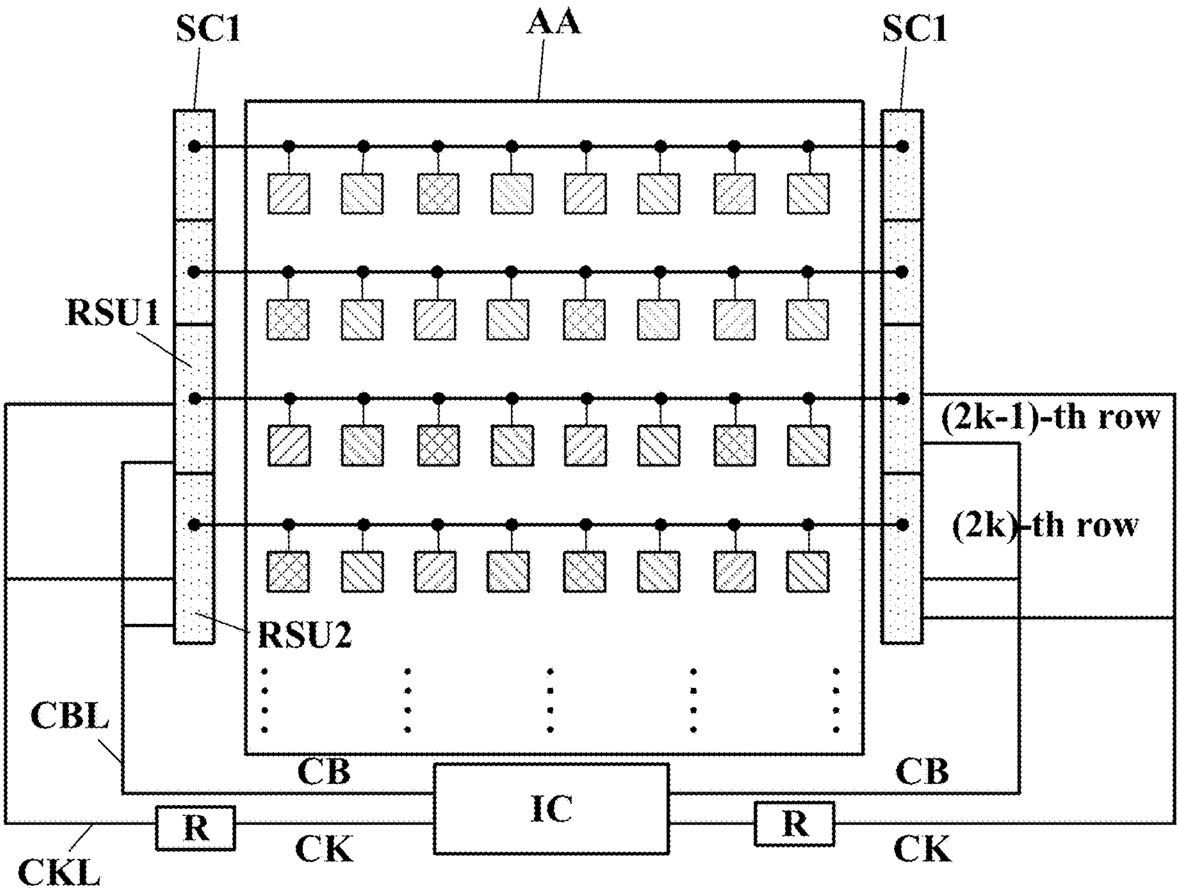
FIG. 16B is a diagram illustrating the structure of a display apparatus in some embodiments according to the present disclosure.

FIG. 16B is a diagram illustrating the structure of a display apparatus in some embodiments according to the present disclosure. Referring to FIG. 16B, the display apparatus in some embodiments includes a resistor R in the first clock signal line CKL so that a resistance loading of the first clock signal line CKL is greater than a resistance loading of the second clock signal line CBL.

In some embodiments, a resistance loading of the first clock signal line CKL is greater than a resistance loading of the second clock signal line CBL by at least 0.1%, e.g., by at least 0.2%, by at least 0.3%, by at least 0.4%, by at least 0.5%, by at least 0.6%, by at least 0.7%, by at least 0.8%, by at least 0.9%, by at least 1.0%, by at least 1.5%, by at least 2.0%, by at least 2.5%, by at least 3.0%, by at least 3.5%, by at least 4.0%, by at least 4.5%, by at least 5.0%, by at least 5.5%, by at least 6.0%, by at least 6.5%, by at least 7.0%, by at least 7.5%, by at least 8.0%, by at least 8.5%, by at least 9.0%, by at least 9.5%, or by at least 10.0%.

In some embodiments, a resistance loading of the first clock signal line CKL is greater than a resistance loading of the second clock signal line CBL by no more than 20%, e.g., no more than 19%, no more than 18%, no more than 17%, no more than 16%, no more than 15%, no more than 14%, no more than 13%, no more than 12%, no more than 11%, no more than 10%, no more than 9%, no more than 8%, no more than 7%, no more than 6%, no more than 5%, no more than 4%, no more than 3%, no more than 2%, or no more than 1%.

Various alternative implementations may be practiced in the present disclosure. In some embodiments, the first clock signal line CKL includes a first material, and the second clock signal line CBL includes a second material, the first material being different from the second material. In one example, the first clock signal line CKL having the first material has a first resistance loading, the second clock signal line CBL having the second material has a second resistance loading, the first resistance loading is greater than the second resistance loading by at least 0.1%, e.g., by at least 0.2%, by at least 0.3%, by at least 0.4%, by at least 0.5%, by at least 0.6%, by at least 0.7%, by at least 0.8%, by at least 0.9%, by at least 1.0%, by at least 1.5%, by at least 2.0%, by at least 2.5%, by at least 3.0%, by at least 3.5%, by at least 4.0%, by at least 4.5%, by at least 5.0%, by at least 5.5%, by at least 6.0%, by at least 6.5%, by at least 7.0%, by at least 7.5%, by at least 8.0%, by at least 8.5%, by at least 9.0%, by at least 9.5%, or by at least 10.0%, In another example, the first resistance loading is greater than the second resistance loading by no more than 20%, e.g., no more than 19%, no more than 18%, no more than 17%, no more than 16%, no more than 15%, no more than 14%, no more than 13%, no more than 12%, no more than 11%, no more than 10%, no more than 9%, no more than 8%, no more than 7%, no more than 6%, no more than 5%, no more than 4%, no more than 3%, no more than 2%, or no more than 1%.

In some embodiments, the first clock signal line CKL has a first line width, and the second clock signal line CBL has a second line width. In one example, the second line width is greater than the first line width so that a resistance loading of the first clock signal line CKL is greater than a resistance loading of the second clock signal line CBL.

In some embodiments, the second line width of the second clock signal line CBL is greater than the first line width of the first clock signal line CKL by at least 0.1%, e.g., by at least 0.2%, by at least 0.3%, by at least 0.4%, by at least 0.5%, by at least 0.6%, by at least 0.7%, by at least 0.8%, by at least 0.9%, by at least 1.0%, by at least 1.5%, by at least 2.0%, by at least 2.5%, by at least 3.0%, by at least 3.5%, by at least 4.0%, by at least 4.5%, by at least 5.0%, by at least 5.5%, by at least 6.0%, by at least 6.5%, by at least 7.0%, by at least 7.5%, by at least 8.0%, by at least 8.5%, by at least 9.0%, by at least 9.5%, or by at least 10.0%.

In some embodiments, the second line width of the second clock signal line CBL is greater than the first line width of the first clock signal line CKL by no more than 20%, e.g., no more than 19%, no more than 18%, no more than 17%, no more than 16%, no more than 15%, no more than 14%, no more than 13%, no more than 12%, no more than 11%, no more than 10%, no more than 9%, no more than 8%, no more than 7%, no more than 6%, no more than 5%, no more than 4%, no more than 3%, no more than 2%, or no more than 1%.

Figure 16C:
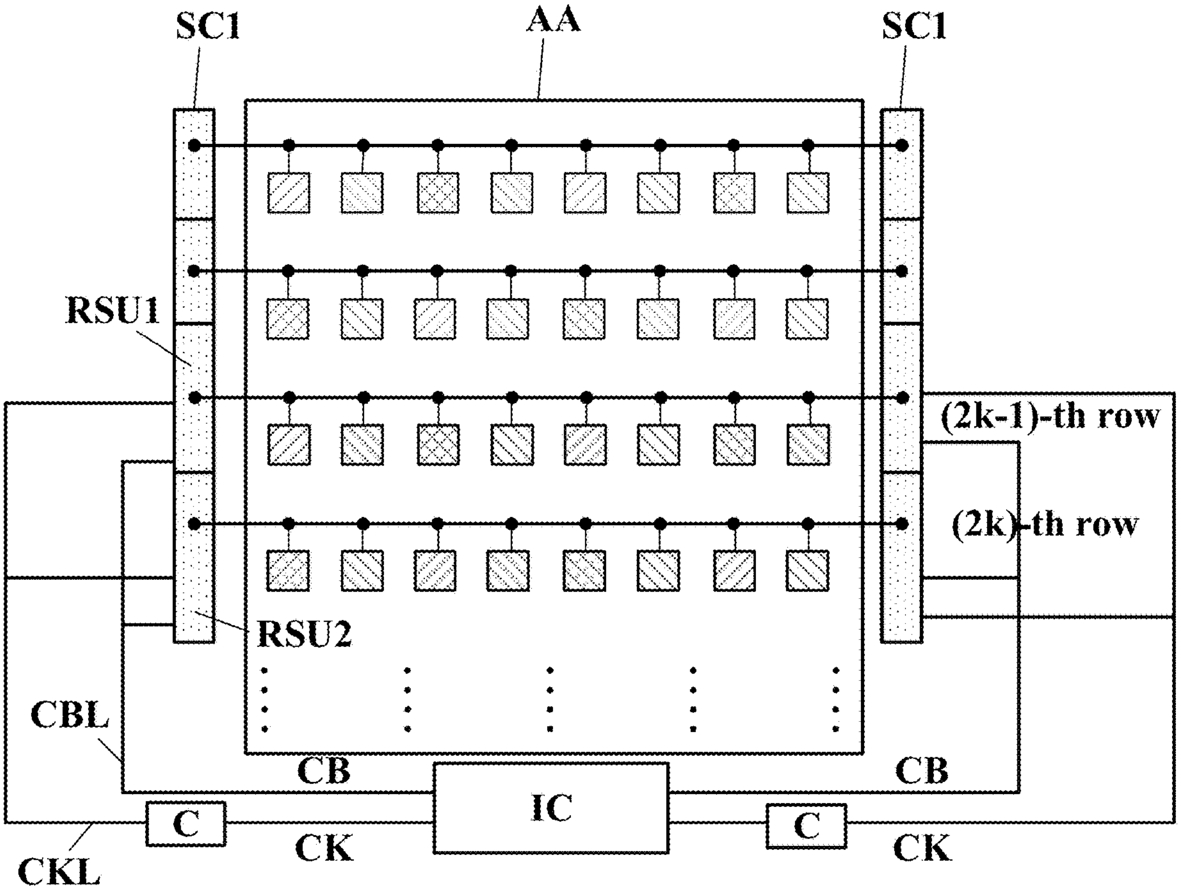
FIG. 16C is a diagram illustrating the structure of a display apparatus in some embodiments according to the present disclosure.

FIG. 16C is a diagram illustrating the structure of a display apparatus in some embodiments according to the present disclosure. Referring to FIG. 16C, the display apparatus in some embodiments includes a capacitor C in the first clock signal line CKL so that a capacitance loading of the first clock signal line CKL is greater than a capacitance loading of the second clock signal line CBL.

In some embodiments, a capacitance loading of the first clock signal line CKL is greater than a capacitance loading of the second clock signal line CBL by at least 0.1%, e.g., by at least 0.2%, by at least 0.3%, by at least 0.4%, by at least 0.5%, by at least 0.6%, by at least 0.7%, by at least 0.8%, by at least 0.9%, by at least 1.0%, by at least 1.5%, by at least 2.0%, by at least 2.5%, by at least 3.0%, by at least 3.5%, by at least 4.0%, by at least 4.5%, by at least 5.0%, by at least 5.5%, by at least 6.0%, by at least 6.5%, by at least 7.0%, by at least 7.5%, by at least 8.0%, by at least 8.5%, by at least 9.0%, by at least 9.5%, or by at least 10.0%.

In some embodiments, a capacitance loading of the first clock signal line CKL is greater than a capacitance loading of the second clock signal line CBL by no more than 20%, e.g., no more than 19%, no more than 18%, no more than 17%, no more than 16%, no more than 15%, no more than 14%, no more than 13%, no more than 12%, no more than 11%, no more than 10%, no more than 9%, no more than 8%, no more than 7%, no more than 6%, no more than 5%, no more than 4%, no more than 3%, no more than 2%, or no more than 1%.

Figure 17A:
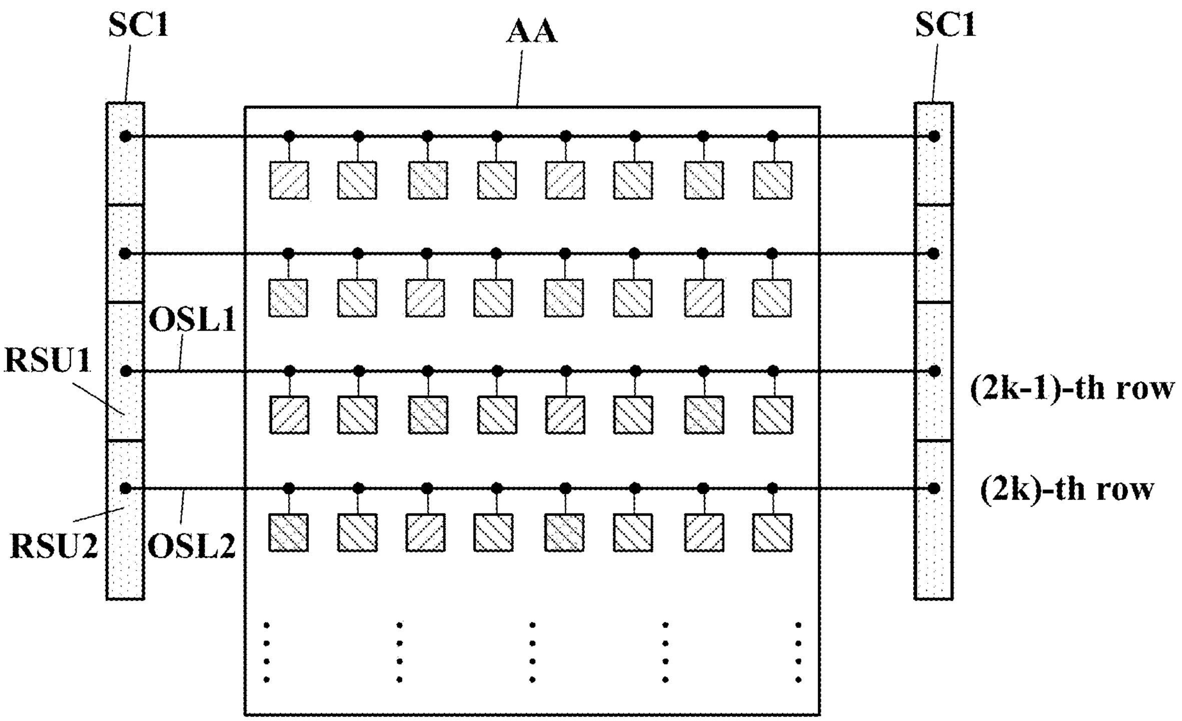
FIG. 17A is a diagram illustrating the structure of a display apparatus in some embodiments according to the present disclosure.

FIG. 17A is a diagram illustrating the structure of a display apparatus in some embodiments according to the present disclosure, Referring to FIG. 17A, the display apparatus in some embodiments includes a first output signal line OSL1 connecting the respective first scan unit RSU1 with a display area AA of the display apparatus, and a second output signal line OSL2 connecting the respective second scan unit RSU2 with the display area AA of the display apparatus. The display area AA includes a plurality of rows of subpixels.

In some embodiments, the first output signal line OSL1 is configured to transmit the first clock signal CK as a gate scanning signal to the (2k−1)-th row of subpixels; and the second output signal line OSL2 is configured to transmit the second clock signal CB as a gate scanning signal to the (2k)-th row of subpixels.

In some embodiments, a resistance-capacitance loading of the first output signal line OSL1 is greater than a resistance-capacitance loading of the second output signal line OSL2 by at least 0.1%, e.g., by at least 0.2%, by at least 0.3%, by at least 0.4%, by at least 0.5%, by at least 0.6%, by at least 0.7%, by at least 0.8%, by at least 0.9%, by at least 1.0%, by at least 1.5%, by at least 2.0%, by at least 2.5%, by at least 3.0%, by at least 3.5%, by at least 4.0%, by at least 4.5%, by at least 5.0%, by at least 5.5%, by at least 6.0%, by at least 6.5%, by at least 7.0%, by at least 7.5%, by at least 8.0%, by at least 8.5%, by at least 9.0%, by at least 9.5%, or by at least 10.0%.

In some embodiments, a resistance-capacitance loading of the first output signal line OSL1 is greater than a resistance-capacitance loading of the second output signal line OSL2 by no more than 20%, e.g., no more than 19%, no more than 18%, no more than 17%, no more than 16%, no more than 15%, no more than 14%, no more than 13%, no more than 12%, no more than 11%, no more than 10%, no more than 9%, no more than 8%, no more than 7%, no more than 6%, no more than 5%, no more than 4%, no more than 3%, no more than 2%, or no more than 1%.

Figure 17B:
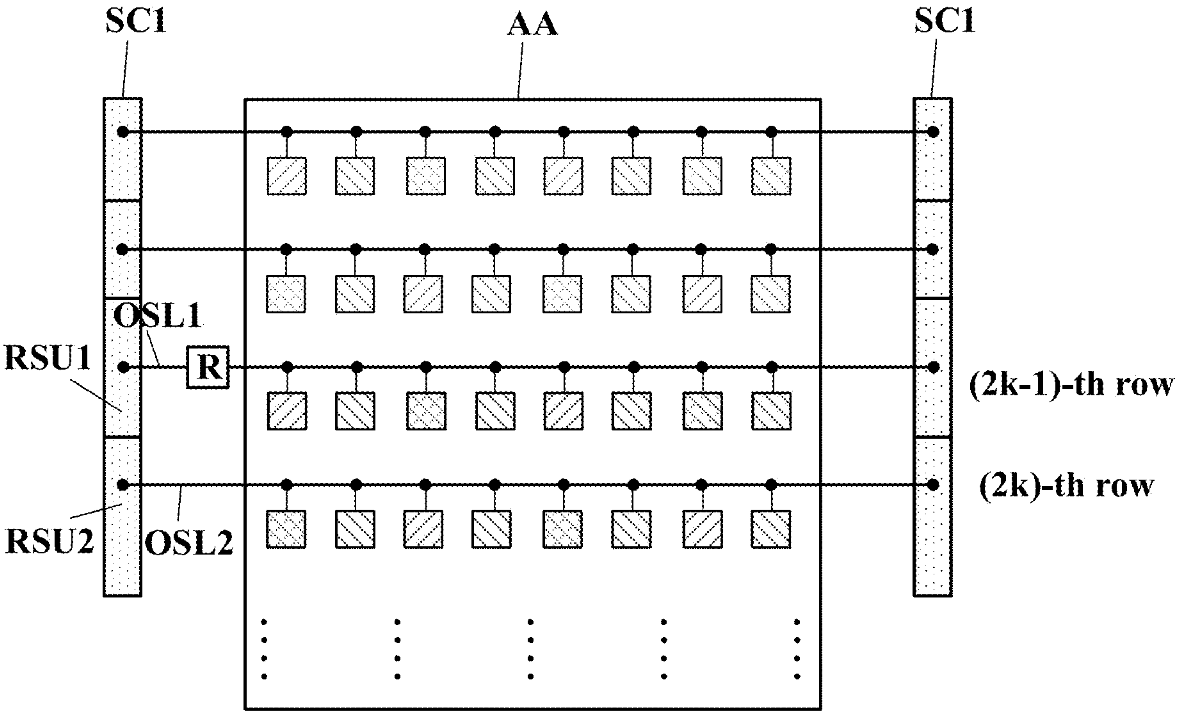
FIG. 17B is a diagram illustrating the structure of a display apparatus in some embodiments according to the present disclosure.

FIG. 17B is a diagram illustrating the structure of a display apparatus in some embodiments according to the present disclosure. Referring to FIG. 178, the display apparatus in some embodiments includes a resistor R in the first output signal line OSL1 so that a resistance loading of the first output signal line OSL1 is greater than a resistance loading of the second output signal line OSL2.

In some embodiments, a resistance loading of the first output signal line OSL1 is greater than a resistance loading of the second output signal line OSL2 by at least 0.1%, e.g., by at least 0.2%, by at least 0.3%, by at least 0.4%, by at least 0.5%, by at least 0.6%, by at least 0.7%, by at least 0.8%, by at least 0.9%, by at least 1.0%, by at least 1.5%, by at least 2.0%, by at least 2.5%, by at least 3.0%, by at least 3.5%, by at least 4.0%, by at least 4.5%, by at least 5.0%, by at least 5.5%, by at least 6.0%, by at least 6.5%, by at least 7.0%, by at least 7.5%, by at least 8.0%, by at least 8.5%, by at least 9.0%, by at least 9.5%, or by at least 10.0%.

In some embodiments, a resistance loading of the first output signal line OSL1 is greater than a resistance loading of the second output signal line OSL2 by no more than 20%, e.g., no more than 19%, no more than 18%, no more than 17%, no more than 16%, no more than 15%, no more than 14%, no more than 13%, no more than 12%, no more than 11%, no more than 10%, no more than 9%, no more than 8%, no more than 7%, no more than 6%, no more than 5%, no more than 4%, no more than 3%, no more than 2%, or no more than 1%.

In one particular example, the first output signal line OSL1 has a resistance of about 5Ω, and the second output signal line OSL2 has a resistance of about 0.5Ω.

Various alternative implementations may be practiced in the present disclosure. In some embodiments, the first output signal line OSL1 includes a first material, and the second output signal line OSL2 includes a second material, the first material being different from the second material. In one example, the first output signal line OSL1 having the first material has a first resistance loading, the second output signal line OSL2 having the second material has a second resistance loading, the first resistance loading is greater than the second resistance loading by at least 0.1%, e.g., by at least 0.2%, by at least 0.3%, by at least 0.4%, by at least 0.5%, by at least 0.6%, by at least 0.7%, by at least 0.8%, by at least 0.9%, by at least 1.0%, by at least 1.5%, by at least 2.0%, by at least 2.5%, by at least 3.0%, by at least 3.5%, by at least 4.0%, by at least 4.5%, by at least 5.0%, by at least 5.5%, by at least 6.0%, by at least 6.5%, by at least 7.0%, by at least 7.5%, by at least 8.0%, by at least 8.5%, by at least 9.0%, by at least 9.5%, or by at least 10.0%. In another example, the first resistance loading is greater than the second resistance loading by no more than 20%, e.g., no more than 19%, no more than 18%, no more than 17%, no more than 16%, no more than 15%, no more than 14%, no more than 13%, no more than 12%, no more than 11%, no more than 10%, no more than 9%, no more than 8%, no more than 7%, no more than 6%, no more than 5%, no more than 4%, no more than 3%, no more than 2%, or no more than 1%.

In some embodiments, the first output signal line OSL1 has a third line width, and the second output signal line OSL2 has a fourth line width. In one example, the fourth line width is greater than the third line width so that a resistance loading of the first output signal line OSL1 is greater than a resistance loading of the second output signal line OSL2.

In some embodiments, the fourth line width of the second output signal line OSL2 is greater than the third line width of the first output signal line OSL1 by at least 0.1%, e.g., by at least 0.2%, by at least 0.3%, by at least 0.4%, by at least 0.5%, by at least 0.6%, by at least 0.7%, by at least 0.8%, by at least 0.9%, by at least 1.0%, by at least 1.5%, by at least 2.0%, by at least 2.5%, by at least 3.0%, by at least 3.5%, by at least 4.0%, by at least 4.5%, by at least 5.0%, by at least 5.5%, by at least 6.0%, by at least 6.5%, by at least 7.0%, by at least 7.5%, by at least 8.0%, by at least 8.5%, by at least 9.0%, by at least 9.5%, or by at least 10.0%.

Figure 17C:
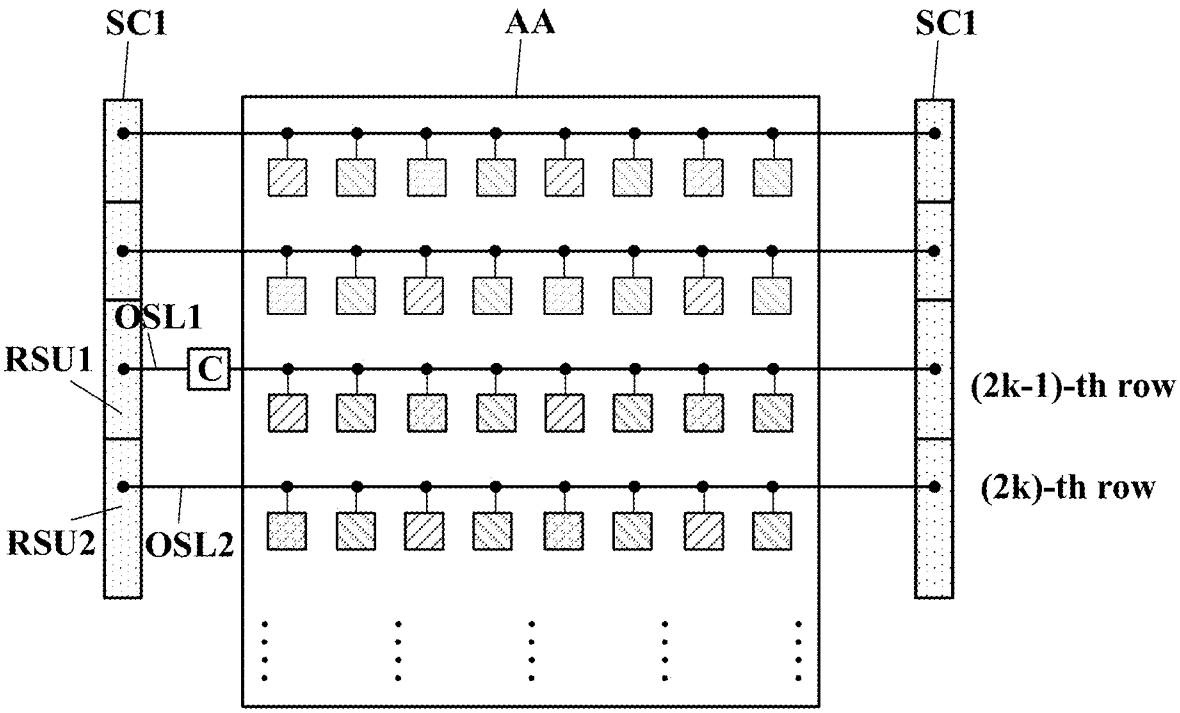
FIG. 17C is a diagram illustrating the structure of a display apparatus in some embodiments according to the present disclosure.

In some embodiments, the fourth line width of the second output signal line OSL2 is greater than the third line width of the first output signal line OSL1 by no more than 20%, e.g., no more than 19%, no more than 18%, no more than 17%, no more than 16%, no more than 15%, no more than 14%, no more than 13%, no more than 12%, no more than 11%, no more than 10%, no more than 9%, no more than 8%, no more than 7%, no more than 6%, no more than 5%, no more than 4%, no more than 3%, no more than 2%, or no more than 1%;

FIG. 17C is a diagram illustrating the structure of a display apparatus in some embodiments according to the present disclosure. Referring to FIG. 17C, the display apparatus in some embodiments includes a capacitor C in the first output signal line OSL1 so that a capacitance loading of the first output signal line OSL1 is greater than a capacitance loading of the second output signal line OSL2.

In some embodiments, a capacitance loading of the first output signal line OSL1 is greater than a capacitance loading of the second output signal line OSL2 by at least 0.1%, e.g., by at least 0.2%, by at least 0.3%, by at least 0.4%, by at least 0.5%, by at least 0.6%, by at least 0.7%, by at least 0.8%, by at least 0.9%, by at least 1.0%, by at least 1.5%, by at least 2.0%, by at least 2.5%, by at least 3.0%, by at least 3.5%, by at least 4.0%, by at least 4.5%, by at least 5.0%, by at least 5.5%, by at least 6.0%, by at least 6.5%, by at least 7.0%, by at least 7.5%, by at least 8.0%, by at least 8.5%, by at least 9.0%, by at least 9.5%, or by at least 10.0%.

In some embodiments, a capacitance loading of the first output signal line OSL1 is greater than a capacitance loading of the second output signal line OSL2 by no more than 20%, e.g., no more than 19%, no more than 18%, no more than 17%, no more than 16%, no more than 15%, no more than 14%, no more than 13%, no more than 12%, no more than 11%, no more than 10%, no more than 9%, no more than 8%, no more than 7%, no more than 6%, no more than 5%, no more than 4%, no more than 3%, no more than 2%, or no more than 1%.

Figure 18A:
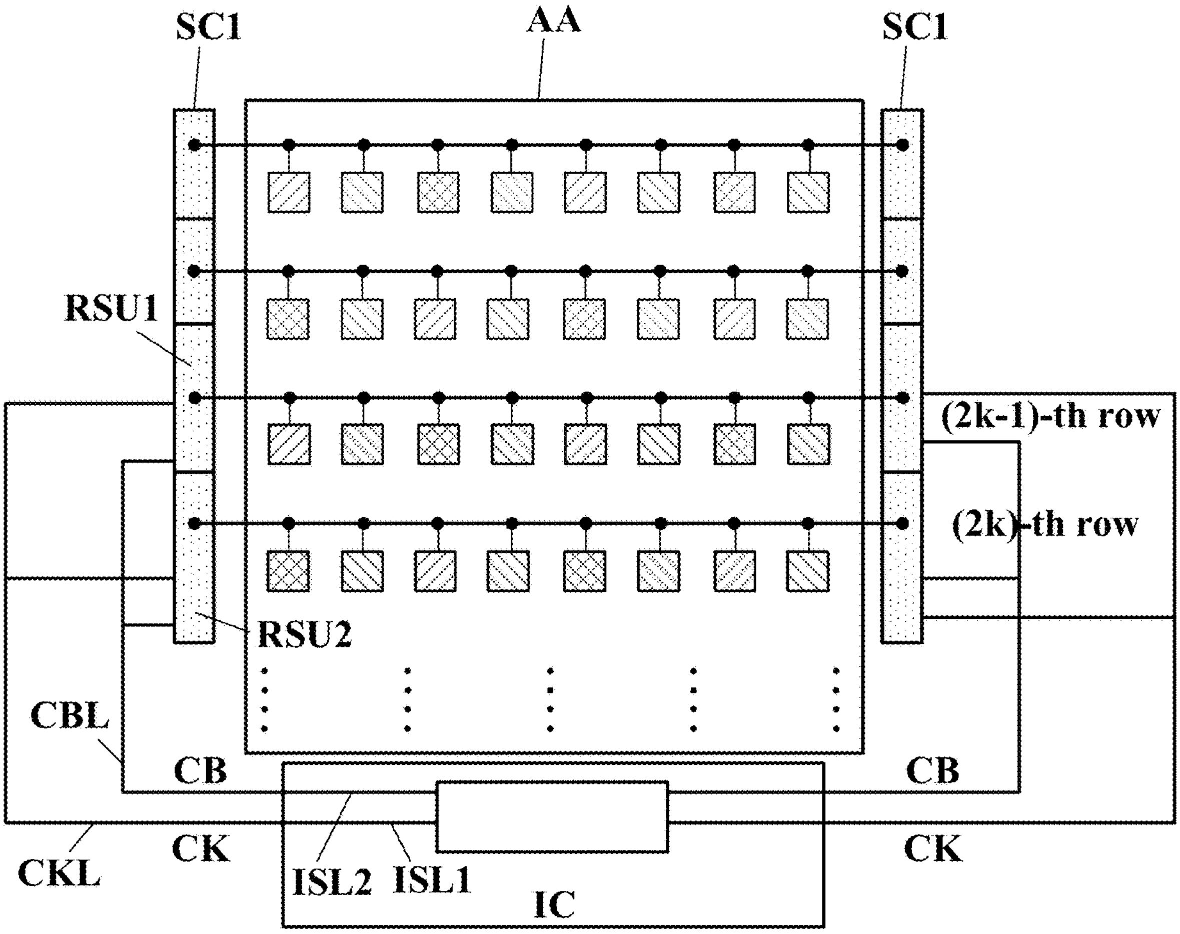
FIG. 18A is a diagram illustrating the structure of a display apparatus in some embodiments according to the present disclosure.

FIG. 18A is a diagram illustrating the structure of a display apparatus in some embodiments according to the present disclosure. Referring to FIG. 18A, the display apparatus in some embodiments includes a display area AA comprising a plurality rows of subpixels; a first scan circuit SC1 comprising a respective first scan unit RSU1 and a respective second scan unit RSU2 configured to provide control signals to two adjacent rows of subpixels, respectively; and an integrated circuit IC configured to provide the first clock signal CK and the second clock signal CB to the first scan circuit SC1.

In some embodiments, the integrated circuit IC includes a first internal signal line ISL1 (inside the integrated circuit IC) configured to output the first clock signal CK to the first clock signal line CKL (outside the integrated circuit IC), and a second internal signal line ISL2 (inside the integrated circuit IC) configured to output the second clock signal CB to the second clock signal line CBL (outside the integrated circuit IC).

In some embodiments, a resistance-capacitance loading of the first internal signal line ISL1 is greater than a resistance-capacitance loading of the second internal signal line ISL2 by at least 0.1%, e.g., by at least 0.2%, by at least 0.3%, by at least 0.4%, by at least 0.5%, by at least 0.6%, by at least 0.7%, by at least 0.8%, by at least 0.9%, by at least 1.0%, by at least 1.5%, by at least 2.0%, by at least 2.5%, by at least 3.0%, by at least 3.5%, by at least 4.0%, by at least 4.5%, by at least 5.0%, by at least 5.5%, by at least 6.0%, by at least 6.5%, by at least 7.0%, by at least 7.5%, by at least 8.0%, by at least 8.5%, by at least 9.0%, by at least 9.5%, or by at least 10.0%.

In some embodiments, a resistance-capacitance loading of the first internal signal line ISL1 is greater than a resistance-capacitance loading of the second internal signal line ISL2 by no more than 20%, e.g., no more than 19%, no more than 18%, no more than 17%, no more than 16%, no more than 15%, no more than 14%, no more than 13%, no more than 12%, no more than 11%, no more than 10%, no more than 9%, no more than 8%, no more than 7%, no more than 6%, no more than 5%, no more than 4%, no more than 3%, no more than 2%, or no more than 1%.

Figure 18B:
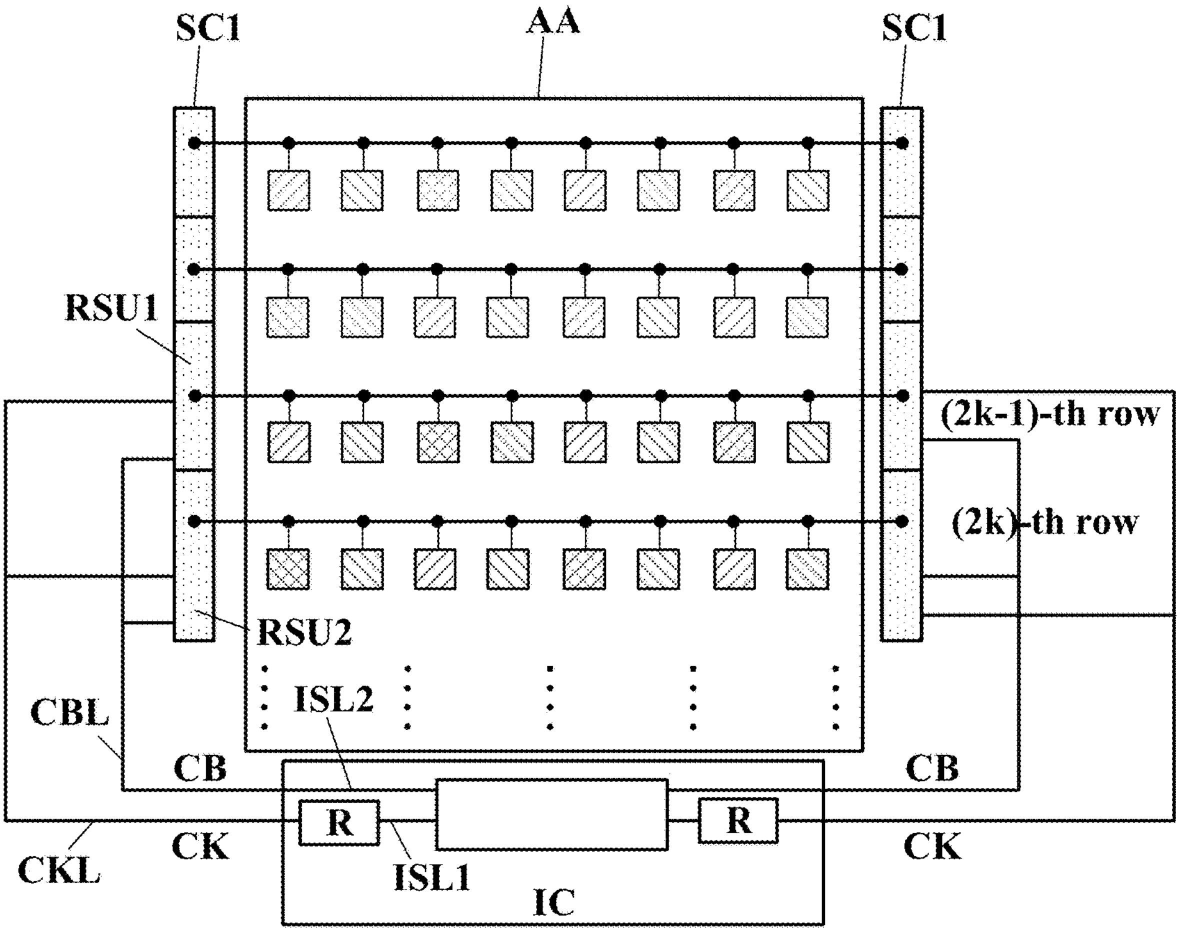
FIG. 18B is a diagram illustrating the structure of a display apparatus in some embodiments according to the present disclosure.

FIG. 18B is a diagram illustrating the structure of a display apparatus in some embodiments according to the present disclosure. Referring to FIG. 18B, the display apparatus in some embodiments includes a resistor R in the first internal signal line ISL1 so that a resistance loading of the first internal signal line ISL1 is greater than a resistance loading of the second internal signal line ISL2.

In some embodiments, a resistance loading of the first internal signal line ISL1 is greater than a resistance loading of the second internal signal line ISL2 by at least 0.1%, e.g., by at least 0.2%, by at least 0.3%, by at least 0.4%, by at least 0.5%, by at least 0.6%, by at least 0.7%, by at least 0.8%, by at least 0.9%, by at least 1.0%, by at least 1.5%, by at least 2.0%, by at least 2.5%, by at least 3.0%, by at least 3.5%, by at least 4.0%, by at least 4.5%, by at least 5.0%, by at least 5.5%, by at least 6.0%, by at least 6.5%, by at least 7.0%, by at least 7.5%, by at least 8.0%, by at least 8.5%, by at least 9.0%, by at least 9.5%, or by at least 10.0%.

In some embodiments, a resistance loading of the first internal signal line ISL1 is greater than a resistance loading of the second internal signal line ISL2 by no more than 20%, e.g., no more than 19%, no more than 18%, no more than 17%, no more than 16%, no more than 15%, no more than 14%, no more than 13%, no more than 12%, no more than 11%, no more than 10%, no more than 9%, no more than 8%, no more than 7%, no more than 6%, no more than 5%, no more than 4%, no more than 3%, no more than 2%, or no more than 1%.

In one particular example, the first internal signal line ISL1 has a resistance of about 5Ω, and the second internal signal line ISL2 has a resistance of about 0.5Ω.

Various alternative implementations may be practiced in the present disclosure. In some embodiments, the first internal signal line ISL1 includes a first material, and the second internal signal line ISL2 includes a second material, the first material being different from the second material. In one example, the first internal signal line ISL1 having the first material has a first resistance loading, the second internal signal line ISL2 having the second material has a second resistance loading, the first resistance loading is greater than the second resistance loading by at least 0.1%, e.g., by at least 0.2%, by at least 0.3%, by at least 0.4%, by at least 0.5%, by at least 0.6%, by at least 0.7%, by at least 0.8%, by at least 0.9%, by at least 1.0%, by at least 1.5%, by at least 2.0%, by at least 2.5%, by at least 3.0%, by at least 3.5%, by at least 4.0%, by at least 4.5%, by at least 5.0%, by at least 5.5%, by at least 6.0%, by at least 6.5%, by at least 7.0%, by at least 7.5%, by at least 8.0%, by at least 8.5%, by at least 9.0%, by at least 9.5%, or by at least 10.0%. In another example, the first resistance loading is greater than the second resistance loading by no more than 20%, e.g., no more than 19%, no more than 18%, no more than 17%, no more than 16%, no more than 15%, no more than 14%, no more than 13%, no more than 12%, no more than 11%, no more than 10%, no more than 9%, no more than 8%, no more than 7%, no more than 6%, no more than 5%, no more than 4%, no more than 3%, no more than 2%, or no more than 1%.

In some embodiments, the first internal signal line ISL1 has a fifth line width, and the second internal signal line ISL2 has a sixth line width. In one example, the sixth line width is greater than the fifth line width so that a resistance loading of the first internal signal line ISL1 is greater than a resistance loading of the second internal signal line ISL2.

In some embodiments, the sixth line width of the second internal signal line ISL2 is greater than the fifth line width of the first internal signal line ISL1 by at least 0.1%, e.g., by at least 0.2%, by at least 0.3%, by at least 0.4%, by at least 0.5%, by at least 0.6%, by at least 0.7%, by at least 0.8%, by at least 0.9%, by at least 1.0%, by at least 1.5%, by at least 2.0%, by at least 2.5%, by at least 3.0%, by at least 3.5%, by at least 4.0%, by at least 4.5%, by at least 5.0%, by at least 5.5%, by at least 6.0%, by at least 6.5%, by at least 7.0%, by at least 7.5%, by at least 8.0%, by at least 8.5%, by at least 9.0%, by at least 9.5%, or by at least 10.0%.

In some embodiments, the sixth line width of the second internal signal line ISL2 is greater than the fifth line width of the first internal signal line ISL1 by no more than 20%, e.g., no more than 19%, no more than 18%, no more than 17%, no more than 16%, no more than 15%, no more than 14%, no more than 13%, no more than 12%, no more than 11%, no more than 10%, no more than 9%, no more than 8%, no more than 7%, no more than 6%, no more than 5%, no more than 4%, no more than 3%, no more than 2%, or no more than 1%.

Figure 18C:
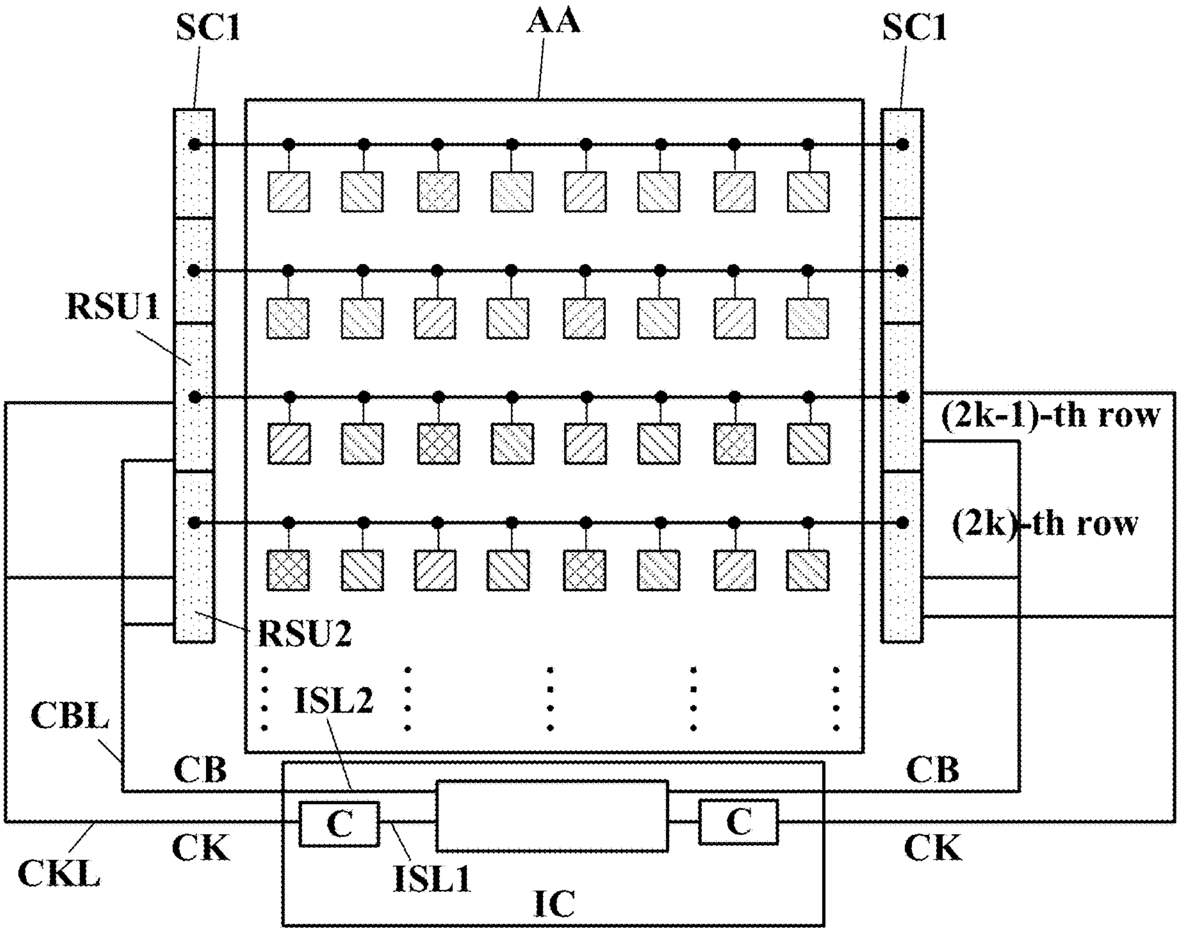
FIG. 18C is a diagram illustrating the structure of a display apparatus in some embodiments according to the present disclosure.

FIG. 18C is a diagram illustrating the structure of a display apparatus in some embodiments according to the present disclosure. Referring to FIG. 18C, the display apparatus in some embodiments includes a capacitor C in the first internal signal line ISL1 so that a capacitance loading of the first internal signal line ISL1 is greater than a capacitance loading of the second internal signal line ISL2.

In some embodiments, a capacitance loading of the first internal signal line ISL1 is greater than a capacitance loading of the second internal signal line ISL2 by at least 0.1%, e.g. by at least 0.2%, by at least 0.3%, by at least 0.4%, by at least 0.5%, by at least 0.6%, by at least 0.7%, by at least 0.8%, by at least 0.9%, by at least 1.0%, by at least 1.5%, by at least 2.0%, by at least 2.5%, by at least 3.0%, by at least 3.5%, by at least 4.0%, by at least 4.5%, by at least 5.0%, by at least 5.5%, by at least 6.0%, by at least 6.5%, by at least 7.0%, by at least 7.5%, by at least 8.0%, by at least 8.5%, by at least 9.0%, by at least 9.5%, or by at least 10.0%.

In some embodiments, a capacitance loading of the first internal signal line ISL1 is greater than a capacitance loading of the second internal signal line ISL2 by no more than 20%, e.g., no more than 19%, no more than 18%, no more than 17%, no more than 16%, no more than 15%, no more than 14%, no more than 13%, no more than 12%, no more than 11%, no more than 10%, no more than 9%, no more than 8%, no more than 7%, no more than 6%, no more than 5%, no more than 4%, no more than 3%, no more than 2%, or no more than 1%.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display apparatus, comprising a display area having a plurality of rows of subpixels, and one or more scan circuits configured to provide control signals to the plurality of rows of subpixels;
   - wherein the one or more scan circuits comprise a first scan circuit and a second scan circuit;
   - the first scan circuit comprises a plurality of first scan units and a plurality of second scan units alternately arranged;
   - a respective first scan unit of the plurality of first scan units and a respective second scan unit of the plurality of second scan units are configured to provide control signals to two adjacent rows of subpixels, respectively;

control signals output from the respective first scan unit and provided to a first adjacent row of subpixels are out of phase with respect to control signals output from the respective second scan unit and provided to a second adjacent row of subpixels;

the second scan circuit comprises a plurality of third scan units;

a respective third scan unit of the plurality of third scan units is configured to provide control signals to the first adjacent row of subpixels and the second adjacent row of subpixels;

control signals output from the respective third scan unit and provided to the first adjacent row of subpixels are in-phase with respect to control signals output from the respective third scan unit and provided to the second adjacent row of subpixels; and a first duration of an effective voltage of a first control signal output from the respective first scan unit is greater than a second duration of an effective voltage of a second control signal output from the respective second scan unit.

2. The display apparatus of claim 1, wherein the respective first scan unit is configured to provide gate scanning signals to data write transistors in pixel driving circuits in the first adjacent row of subpixels;

the respective second scan unit is configured to provide gate scanning signals to data write transistors in pixel driving circuits in the second adjacent row of subpixels; and the respective third scan unit is configured to provide gate scanning signals to compensating transistors in pixel driving circuits in the first adjacent row of subpixels and in the second adjacent row of subpixels.

3. The display apparatus of claim 1, wherein compensating durations for compensating threshold voltages of driving transistors in pixel driving circuits in the two adjacent rows of subpixels and in a same column of subpixels are different from each other.

4. The display apparatus of claim 1, comprising K number of rows of subpixels, K being an integer greater than 1;

wherein the K number of rows of subpixels comprise a (2k−1)-th row of subpixels and a (2k)-th row of subpixels, $1 \le k \le (K/2)$, k being an integer;

the respective first scan unit is configured to provide control signals to the (2k−1)-th row of subpixels;

the respective second scan unit is configured to provide control signals to the (2k)-th row of subpixels;

the respective third scan unit is configured to provide control signals to the (2k−1)-th row of subpixels and the (2k)-th row of subpixels;

control signals output from the respective first scan unit and provided to the (2k−1)-th row of subpixels are out of phase with respect to control signals output from the respective second scan unit and provided to the (2k)-th row of subpixels; and control signals output from the respective third scan unit and provided to the (2k−1)-th row of subpixels are in-phase with respect to control signals output from the respective third scan unit and provided to the (2k)-th row of subpixels.

5. The display apparatus of claim 4, wherein the respective first scan unit is configured to provide gate scanning signals to data write transistors in pixel driving circuits in the (2k−1)-th row of subpixels;

the respective second scan unit is configured to provide gate scanning signals to data write transistors in pixel driving circuits in the (2k)-th row of subpixels; and the respective third scan unit is configured to provide gate scanning signals to compensating transistors in pixel driving circuits in the (2k−1)-th row of subpixels and in the (2k)-th row of subpixels.

6. The display apparatus of claim 4, wherein compensating durations for compensating threshold voltages of driving transistors in pixel driving circuits in a same column of subpixels, and in the (2k−1)-th row of subpixels and in the (2k)-th row of subpixels, respectively, are different from each other.

7. The display apparatus of claim 4, wherein a first compensation duration for compensating threshold voltages of driving transistors in pixel driving circuits in the (2k−1)-th row of subpixels and in a same column of subpixels is greater than a second compensation duration for compensating threshold voltages of driving transistors in pixel driving circuits in the (2k)-th row of subpixels and in the same column of subpixels; and a first luminance value of a first subpixel in the (2k−1)-th row of subpixels and in the same column of subpixels is substantially the same as a second luminance value of a second subpixel in the (2k)-th row of subpixels and in the same column of subpixels, when data signals of a same voltage are applied to the first subpixel and the second subpixel, respectively.

8. The display apparatus of claim 1, wherein output of the first control signal from the respective first scan unit is controlled by a second clock signal;

output of the second control signal from the respective second scan unit is controlled by a first clock signal;

a duration of an effective voltage of the second clock signal is greater than a duration of an effective voltage of the first clock signal.

9. The display apparatus of claim 1, wherein the first control signal output from the respective first scan unit is a second clock signal;

the second control signal output from the respective second scan unit is a first clock signal; and a duration of an effective voltage of the second clock signal is greater than a duration of an effective voltage of the first clock signal.

10. The display apparatus of claim 1, wherein the first duration of the effective voltage of the first control signal output from the respective first scan unit is controlled by a second clock signal; and the second duration of the effective voltage of the second control signal output from the respective second scan unit is controlled by a first clock signal.

11. The display apparatus of claim 1, wherein the first duration of the effective voltage of the first control signal output from the respective first scan unit is substantially the same as a duration of an effective voltage of a second clock signal; and the second duration of the effective voltage of the second control signal output from the respective second scan unit is substantially the same as a duration of an effective voltage of a first clock signal.

12. The display apparatus of claim 1, further comprising:

an integrated circuit configured to provide a first clock signal and a second clock signal to the first scan circuit;

a first clock signal line connecting the integrated circuit with the respective first scan unit or the respective second scan unit, and configured to provide the first clock signal to the respective first scan unit or the respective second scan unit;

a second clock signal line connecting the integrated circuit with the respective first scan unit or the respective second scan unit, and configured to provide the second clock signal to the respective first scan unit or the respective second scan unit; and a resistance-capacitance loading of the first clock signal line is greater than a resistance-capacitance loading of the second clock signal line by 0.1% to 20%.

13. The display apparatus of claim 12, further comprises a resistor and/or a capacitor in the first clock signal line so that a resistance loading and/or a capacitance loading of the first clock signal line is greater than a resistance loading and/or a capacitance loading of the second clock signal line by 0.1% to 20%.

14. The display apparatus of claim 12, wherein the first clock signal line has a first line width;

the second clock signal line has a second line width; and the second line width of the second clock signal line is greater than the first line width of the first clock signal line by 0.1% to 20%.

15. The display apparatus of claim 1, further comprising:

a first output signal line connecting the respective first scan unit with the display area; and a second output signal line connecting the respective second scan unit with the display area;

wherein the first output signal line is configured to transmit a first clock signal as a gate scanning signal to the first adjacent row of subpixels;

the second output signal line is configured to transmit a second clock signal as a gate scanning signal to the second adjacent row of subpixels; and a resistance-capacitance loading of the first output signal line is greater than a resistance-capacitance loading of the second output signal line by 0.1% to 20%.

16. The display apparatus of claim 15, further comprises a resistor and/or a capacitor in the first output signal line so that a resistance loading and/or a capacitance loading of the first output signal line is greater than a resistance loading and/or a capacitance loading of the second output signal line by 0.1% to 20%.

17. The display apparatus of claim 15, wherein the first output signal line has a third line width;

the second output signal line has a fourth line width; and the fourth line width of the second output signal line is greater than the third line width of the first output signal line by 0.1% to 20%.

18. The display apparatus of claim 1, further comprising an integrated circuit configured to provide a first clock signal and a second clock signal to the first scan circuit;

a first clock signal line connecting the integrated circuit with the respective first scan unit or the respective second scan unit, and configured to provide the first clock signal to the respective first scan unit or the respective second scan unit;

a second clock signal line connecting the integrated circuit with the respective first scan unit or the respective second scan unit, and configured to provide the second clock signal to the respective first scan unit or the respective second scan unit; and wherein the integrated circuit comprises a first internal signal line configured to output the first clock signal to the first clock signal line, and a second internal signal line configured to output the second clock signal to the second clock signal line; and a resistance-capacitance loading of the first internal signal line is greater than a resistance-capacitance loading of the second internal signal line by 0.1% to 20%.

19. The display apparatus of claim 18, further comprises a resistor and/or a capacitor in the first internal signal line so that a resistance loading and/or a capacitance loading of the first internal signal line is greater than a resistance loading and/or a capacitance loading of the second internal signal line by 0.1% to 20%.

20. The display apparatus of claim 1, wherein the one or more scan circuits further comprises a third scan circuit, a fourth scan circuit, and a fifth scan circuit;

a respective stage of cascaded scan unit of a plurality of stages of cascaded scan units of the third scan circuit is configured to provide control signals to multiple rows of subpixels;

a respective stage of cascaded scan unit of a plurality of stages of cascaded scan units of the fourth scan circuit is configured to provide control signals to multiple rows of subpixels;

a respective stage of cascaded scan unit of a plurality of stages of cascaded scan units of the fifth scan circuit is configured to provide control signals to multiple rows of subpixels;

the fourth scan circuit is a first reset control signal generating circuit configured to generate first reset control signals for a plurality of first reset control signal lines;

the third scan circuit is a second reset control signal generating circuit configured to generate second reset control signals for a plurality of second reset control signal lines; and the fifth scan circuit is a light emitting control signal generating circuit configured to generate light emitting control signals for a plurality of light emitting control signal lines.

* * * * *